US012611006B2

(12) United States Patent　　　　　(10) Patent No.: US 12,611,006 B2
Case et al.　　　　　　　　　　　　　　(45) Date of Patent: Apr. 28, 2026

(54) CUSHIONING COMPONENT FOR A WEARABLE ARTICLE AND METHOD OF MANUFACTURING SAME

(71) Applicant: NIKE, Inc., Beaverton, OR (US)

(72) Inventors: Patrick R. Case, Beaverton, OR (US); Tory M. Cross, Portland, OR (US); Viviane Labelle, Portland, OR (US); Yuan Mu, Portland, OR (US); Kevin C. Sze, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/974,973

(22) Filed: Dec. 10, 2024

(65) Prior Publication Data

US 2025/0194741 A1　　Jun. 19, 2025

Related U.S. Application Data

(60) Provisional application No. 63/610,442, filed on Dec. 15, 2023.

(51) Int. Cl.
　　*A43B 13/18*　　　(2006.01)
　　*A43B 13/20*　　　(2006.01)
　　*B29D 35/14*　　　(2010.01)
(52) U.S. Cl.
　　CPC ............ *A43B 13/186* (2013.01); *A43B 13/20* (2013.01); *B29D 35/142* (2013.01)
(58) Field of Classification Search
　　CPC ..... A43B 13/20; A43B 13/186; A43B 13/125; A43B 13/04; A47C 37/087
　　See application file for complete search history.

(56) References Cited

U.S. PATENT DOCUMENTS

| | | | |
|---|---|---|---|
| 4,183,156 A | 1/1980 | Rudy | |
| 4,219,945 A | 9/1980 | Rudy | |
| 4,774,774 A | 10/1988 | Allen, Jr. | |
| 4,936,029 A | 6/1990 | Rudy | |
| 5,042,176 A | 8/1991 | Rudy | |
| 5,713,141 A | 2/1998 | Mitchell et al. | |

(Continued)

FOREIGN PATENT DOCUMENTS

| | | |
|---|---|---|
| CN | 115153151 A | 10/2022 |
| TW | 200601993 A | 1/2006 |

(Continued)

*Primary Examiner* — Haley A Smith

(74) *Attorney, Agent, or Firm* — Shook, Hardy & Bacon L.L.P.

(57) ABSTRACT

A cushioning component for a wearable article includes a bladder with barrier sheets defining an interior cavity. A core is disposed in the interior cavity and is spaced entirely inward of a peripheral bond between the barrier sheets. The core traverses the interior cavity between and is bonded to the opposing inner surfaces of the barrier sheets at a plurality of bonds. The core includes at least one polymeric sheet defining a plurality of spaced slots extending therethrough, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds.

20 Claims, 12 Drawing Sheets

(56) References Cited

U.S. PATENT DOCUMENTS

| | | | | |
|---|---|---|---|---|
| 5,755,001 | A * | 5/1998 | Potter | A43B 21/28 |
| | | | | 12/146 B |
| 5,952,065 | A | 9/1999 | Mitchell et al. | |
| 6,013,340 | A | 1/2000 | Bonk et al. | |
| 6,082,025 | A | 7/2000 | Bonk et al. | |
| 6,127,026 | A | 10/2000 | Bonk et al. | |
| 6,203,868 | B1 | 3/2001 | Bonk et al. | |
| 6,321,465 | B1 | 11/2001 | Bonk et al. | |
| 8,479,412 | B2 * | 7/2013 | Peyton | B32B 7/12 |
| | | | | 36/28 |
| 10,362,833 | B2 | 7/2019 | Campos, II et al. | |
| 10,694,814 | B2 | 6/2020 | Bailey et al. | |
| 11,166,524 | B2 * | 11/2021 | Case | A43B 13/20 |
| 11,213,094 | B2 | 1/2022 | Case et al. | |
| 11,219,271 | B2 | 1/2022 | Auyang et al. | |
| 11,540,594 | B2 * | 1/2023 | Case | A43B 13/203 |
| 2002/0139471 | A1 | 10/2002 | Tawney et al. | |
| 2011/0277347 | A1 | 11/2011 | Monfils et al. | |
| 2014/0053427 | A1 | 2/2014 | Patton | |
| 2015/0013190 | A1 | 1/2015 | Davison | |
| 2017/0042286 | A1 | 2/2017 | Meschter et al. | |
| 2018/0338577 | A1 | 11/2018 | Elder et al. | |
| 2018/0338578 | A1 | 11/2018 | Elder et al. | |
| 2019/0365036 | A1 | 12/2019 | Meeker | |
| 2020/0154825 | A1 * | 5/2020 | Case | A43B 13/206 |
| 2020/0154826 | A1 * | 5/2020 | Case | A43B 13/206 |
| 2021/0368920 | A1 | 12/2021 | Elder et al. | |
| 2022/0022598 | A1 * | 1/2022 | Case | A43B 13/206 |
| 2024/0206591 | A1 | 6/2024 | Case et al. | |

FOREIGN PATENT DOCUMENTS

| | | |
|---|---|---|
| TW | 202027639 A | 8/2020 |
| TW | 202126208 A | 7/2021 |
| WO | 0170060 A2 | 9/2001 |

* cited by examiner

CUSHIONING COMPONENT FOR A WEARABLE ARTICLE AND METHOD OF MANUFACTURING SAME

CROSS-REFERENCE TO RELATED APPLICATION

This application claims the benefit of priority to U.S. Provisional Application No. 63/610,442, filed Dec. 15, 2023 which is incorporated by reference in its entirety.

TECHNICAL FIELD

The present disclosure generally relates to a cushioning component for a wearable article, including a bladder and a core of at least one polymeric sheet disposed in the bladder, as well as to a method of manufacturing the cushioning component.

BACKGROUND

Wearable articles, such as articles of footwear, often include cushioning components. Some cushioning components are configured as fluid-filled bladders that enclose an interior cavity to retain a gas in the interior cavity, providing cushioning when loaded.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
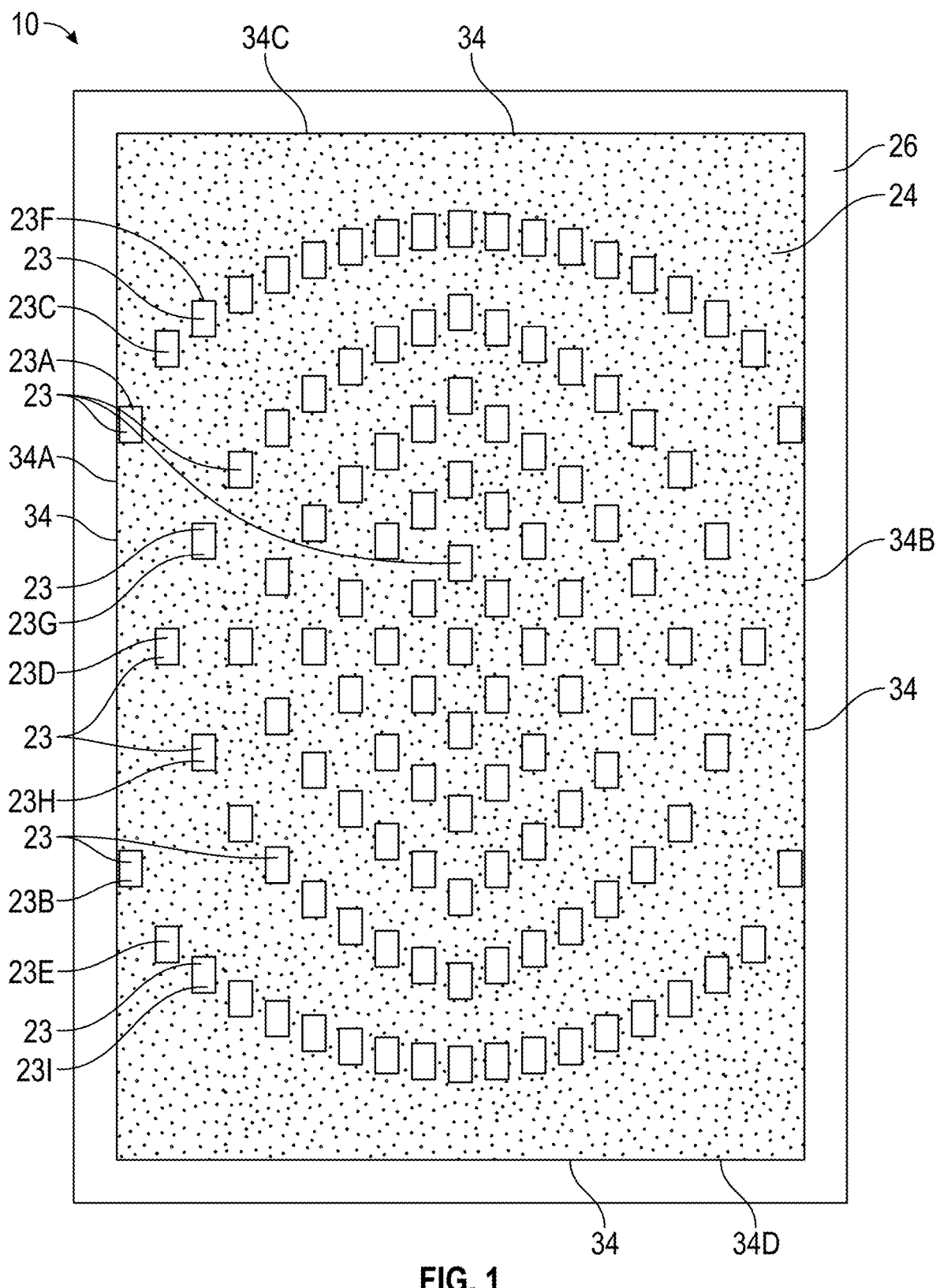
FIG. 1 is a plan view of a side of a polymeric sheet with anti-weld material disposed in a pattern thereon.

The present disclosure generally relates to a cushioning component for a wearable article that includes a bladder and a core. The bladder includes a first barrier sheet and a second barrier sheet defining an interior cavity between opposing inner surfaces of the first barrier sheet and the second barrier sheet. The first barrier sheet and the second barrier sheet are sealed to one another along a peripheral bond to enclose the interior cavity and retain a gas in the interior cavity. The core is disposed in the interior cavity and is spaced entirely inward of the peripheral bond. The core traverses the interior cavity between and is bonded to the opposing inner surfaces of the first barrier sheet and the second barrier sheet at a plurality of bonds to tether the first barrier sheet to the second barrier sheet. The core is displaced from the opposing inner surfaces by the gas at unbonded areas of the core.

The core includes at least one polymeric sheet defining a plurality of spaced slots extending therethrough from a first side of the at least one polymeric sheet to a second side of the at least one polymeric sheet, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds.

Providing a tensile component within a bladder may be useful in restraining the bladder when inflated, preventing it from adopting a ball-like shape. A tensile component such as the core according to the present disclosure enables bonding the at least one polymeric sheet of the core to the barrier sheets at bonds having patterns that result in technical advantages both in performance aspects of the cushioning component and ease of manufacturing the cushioning component.

In one or more implementations, anti-weld material is disposed on the multi-sheet core at the unbonded areas. In an implementation, this is achieved by blocker ink disposed on the core at the unbonded areas. By utilizing anti-weld material disposed on the polymeric sheets, the patterns of bonds of the multi-sheet core to the inner surfaces of the barrier sheets are controlled to determine the final geometry of the completed cushioning component, including height differentials in different regions of an article of footwear, toe spring, etc.

Moreover, utilizing anti-weld material enables ease in manufacturing. For example, when the anti-weld material is blocker ink, patterns may be digitally implemented relatively easily in comparison to other tensile components that require specific molds or mold inserts to control bond formation of barrier sheets to internally placed polymeric sheets. By disposing the anti-weld material so that it extends to an outer perimeter of the multi-sheet core at the inner surfaces of the barrier sheets, and by ensuring that the outer perimeter of the multi-sheet core is entirely inward of the peripheral bond of the barrier sheets, the patterns of bonds of the multi-sheet core do not result in any sealed chambers within the bladder that are not in fluid communication with the interior cavity. Gas in the interior cavity is in fluid communication around the core without the core creating any sealed chambers within the bladder that are not in fluid communication with the interior cavity. In other words, the at least one polymeric sheet does not subdivide the interior cavity into separate, sealed chambers. In this way, the multi-sheet core itself controls the final geometry of the inflated cushioning component but does not affect the cushioning response of the cushioning component under dynamic loading. Additionally, by utilizing anti-weld material, the cushioning component may be relatively flat prior to inflation. Stated differently, the multi-sheet core may lay flat within the bladder with unbonded areas contacting the opposing inner surfaces of the first and second barrier sheets (or adjacent surfaces of the polymeric sheets) when the interior cavity of the bladder is uninflated.

In an aspect, the first side of the core may be bonded to the inner surface of the first barrier sheet at a first set of bonds of the plurality of bonds, and the second side of the core may be bonded to the inner surface of the second barrier sheet at a second set of bonds of the plurality of bonds. The bonds of the first set may alternate with the bonds of the second set along each of the strips. This manner of alternating may allow the finest level of control of the geometry (e.g., the curvature) of the outer surfaces of the first and second barrier sheets.

In an implementation, the plurality of strips includes a first strip and a second strip adjacent to the first strip. A distance from a first end of the first strip to the at least one bond on the first strip nearest the first end of the first strip is different than a distance from a first end of the second strip to the at least one bond on the second strip nearest to the first end of the second strip. By placing the bonds at different distances from the ends of the respective strips, a desired geometry of the outer surface of the bladder near the ends of the core can be achieved.

In another example, a desired geometry at the outer surface is affected by utilizing different spacing between adjacent bonds on different ones of the strips. For example, the plurality of strips may include a first strip and a second strip adjacent to the first strip. Each of the first strip and the second strip may include two or more of the bonds. The two or more bonds on the first strip may be spaced differently from one another than the two or more bonds on the second strip.

In an implementation, the first strip may be closer to a perimeter of the core than the second strip, and the two or more bonds on the first strip may be further apart from one another than the two or more bonds on the second strip. The first and second barrier sheets are thus held closer to one another by the core at the second strip than at the first strip, creating a depression at an outer surface of the bladder from the first strip to the second strip.

In a non-limiting example, the number of bonds on each of the strips may increase in a direction away from each of the side edges such that the strips further from the side edges have a greater number of the bonds than the strips closer to the side edges. In an implementation in which the wearable article is an article of footwear, the cushioning component may be included in a sole structure of the article of footwear and disposed in a heel region of the article of footwear. Spacing between the bonds on strips closer to the perimeter may be greater than spacing between the bonds on strips further from the perimeter such that the core creates a depression at the outer surface of the first barrier sheet that serves as at least a portion of a footbed such as a heel cup.

In an example, at least some of the slots may be curved and follow a curved perimeter of the core. In an implementation in which the wearable article is an article of footwear, the cushioning component may be included in a sole structure of the article of footwear and disposed in a heel region of the article of footwear. At least some of the slots may be arranged in a series that curves around a rear of the heel region from a medial side to a lateral side of the cushioning component. In a non-limiting example, spacing between the bonds on strips closer to the perimeter may be greater than spacing between the bonds on strips further from the perimeter such that the core creates a depression at the outer surface of the first barrier sheet that serves as a heel cup.

In an implementation, at least some of the slots may be linear. For example, the slots may be linear and extend parallel to opposing first and second side edges of the core. In one or more configurations, at least some of the strips have of a constant width. In one implementation, all of the strips are linear and have a constant width. In another example, at least some of the strips are curved and have a constant width.

A method of manufacturing a cushioning component for a wearable article includes disposing blocker ink on opposing first and second sides of at least one polymeric sheet and cutting a plurality of slots through the at least one polymeric sheet. Each slot has a first end and a second end with both the first end and the second end inward of an outer perimeter of the polymeric sheet such that the at least one polymeric sheet includes a plurality of strips bordering the slots and decoupled from one another at the slots. The method of manufacturing further includes placing the at least one polymeric sheet between a first barrier sheet and a second barrier sheet as a core, and thermally bonding: (i) the at least one polymeric sheet to opposing inner surfaces of the first barrier sheet and the second barrier sheet at a plurality of bonds at uncovered areas (e.g., areas of the at least one polymeric sheet at which the blocker ink is not disposed) to tether the first barrier sheet to the second barrier sheet, as well as (ii) the first barrier sheet to the second barrier sheet at a peripheral bond entirely outward of the at least one polymeric sheet to enclose an interior cavity that extends between the opposing inner surfaces to define a bladder.

The plurality of bonds may be arranged in a pattern such that a gas in the interior cavity is in fluid communication around the at least one polymeric sheet without the at least one polymeric sheet creating any sealed chambers within the bladder that are not in fluid communication with the interior cavity.

In an aspect, disposing the blocker ink on the opposing first and second sides of the at least one polymeric sheet may be by digitally printing a first pattern of blocker ink on the first side and a second pattern of blocker ink on the second side. The first pattern may be different than the second pattern such that at least some areas on which blocker ink is not disposed on the first side are opposite from areas on the second side at which blocker ink is disposed.

In an implementation in which the wearable article is an article of footwear, the method may further include disposing the cushioning component in a sole structure of an article of footwear. For example, the cushioning component may be disposed in a heel region of the article of footwear, and spacing between the bonds on strips closer to a perimeter of the core may be greater than spacing between the bonds on strips further from the perimeter of the core such that the core creates a depression at the outer surface of the first barrier sheet that serves as at least a portion of a footbed.

The above features and advantages and other features and advantages of the present teachings are readily apparent from the following detailed description of the modes for carrying out the present teachings when taken in connection with the accompanying drawings. It should be understood that, even though in the following the embodiments may be separately described, single features thereof may be combined in additional embodiments.

Figures 4, 5, 6:
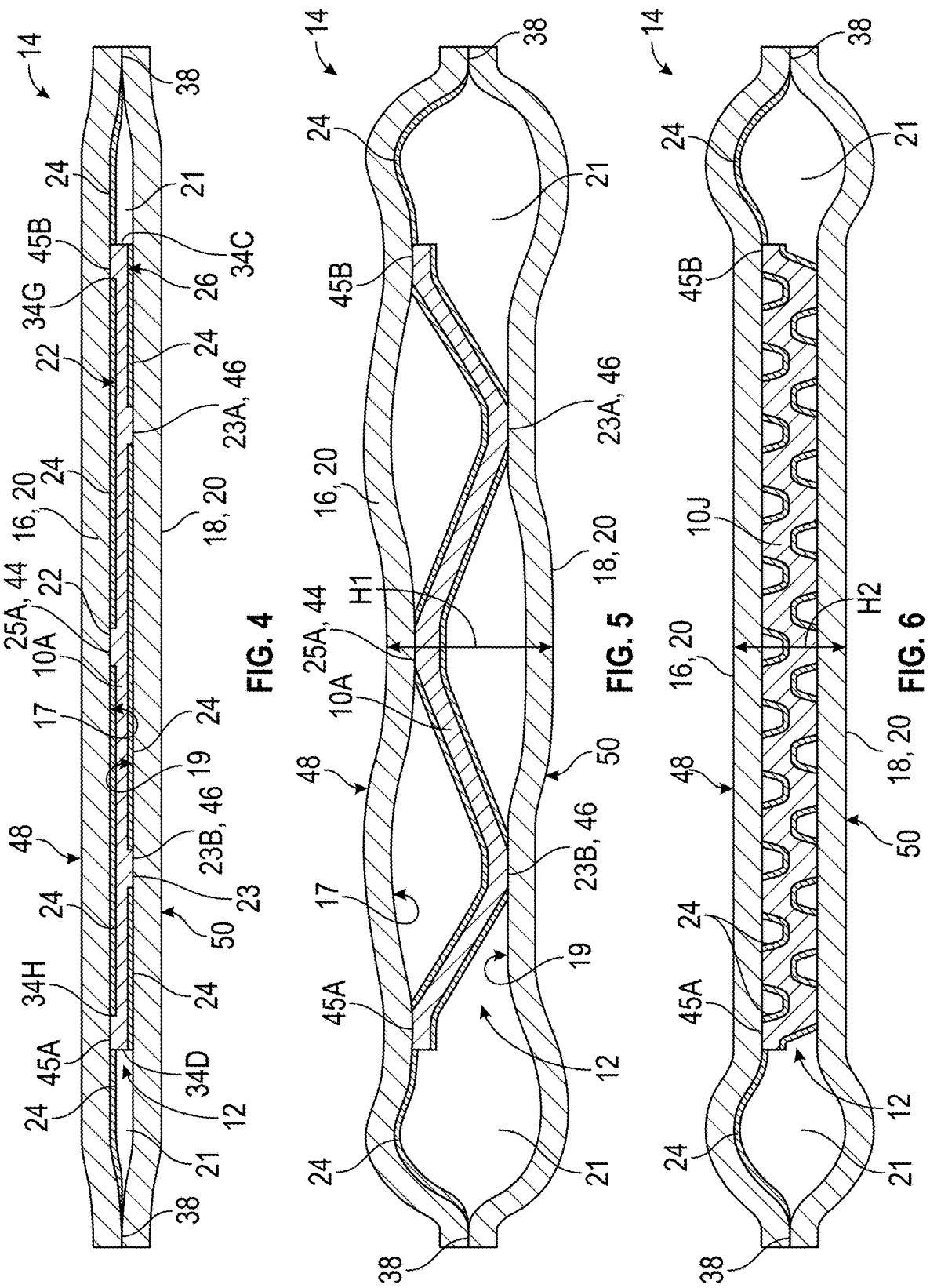
FIG. 4 is a cross-sectional view of a cushioning component in an uninflated state, including the polymeric sheet of FIG. 3 as a core disposed between and bonded to opposing inner surfaces of first and second barrier sheets of a bladder.
FIG. 5 is a cross-sectional view of the cushioning component of FIG. 4 in an inflated state taken at lines 5-5 in FIG. 7.
FIG. 6 is a cross-sectional view of the cushioning component of FIG. 4 in an inflated state taken at lines 6-6 in FIG. 7.

FIG. 1 is a perspective view of a polymeric sheet 10 included as a core 12 of a cushioning component 14 shown in FIGS. 4-8. The core 12 is bonded to first and second barrier sheets 16, 18, that form a bladder 20 defining an interior cavity 21 between opposing inner surfaces of the first and second barrier sheets 16, 18 (e.g., between inner surface 17 of the first barrier sheet 16 and inner surface 19 of the second barrier sheet 18, as indicated in FIG. 5). The polymeric sheet 10 is a single polymeric sheet and is the only polymeric sheet included in the core 12. Although the polymeric sheet 10 is a single polymeric sheet, in some examples, it may be comprised of multiple layers of materials, as discussed herein. Additionally, in some embodiments, a core may be used that includes multiple polymeric sheets.

FIG. 1 shows a side 26 of the polymeric sheet 10. The side 26 is referred to herein as a second side. Anti-weld material 24 is disposed on the second side 26 of the polymeric sheet 10 in a pattern that leaves a number of areas uncovered by the anti-weld material 24. The printed pattern of anti-weld material 24 in FIG. 1 is referred to herein as a second predetermined pattern. The anti-weld material 24 is indicated with shading and the uncovered areas 23 are shown without shading. Only some of the uncovered areas 23 are indicated with a reference number. The areas 23 are each of a generally rectangular shape and are of identical size (e.g., identical width and identical length). In other embodiments, the areas 23 left uncovered by the anti-weld material 24 may have different shapes and/or sizes.

As shown, the pattern of anti-weld material 24 has a first edge 34A, a second edge 34B a third edge 34C, and a fourth edge 34D. The edges 34A and 34B are opposite from one another and the edges 34C and 34D are opposite from one another. The polymeric sheet 10 is trimmed along the edges 34A, 34B, 34C, and 34D before the core 12 is placed between the barrier sheets 16, 18. Accordingly, the edges 34A, 34B, 34C, and 34D become an outer perimeter 34 of the core 12.

The anti-weld material 24 may be disposed as blocker ink on the polymeric sheet 10 via a computer-controlled printer head or heads (not shown) according to a stored algorithm representing a predetermined printing pattern.

Figure 2:
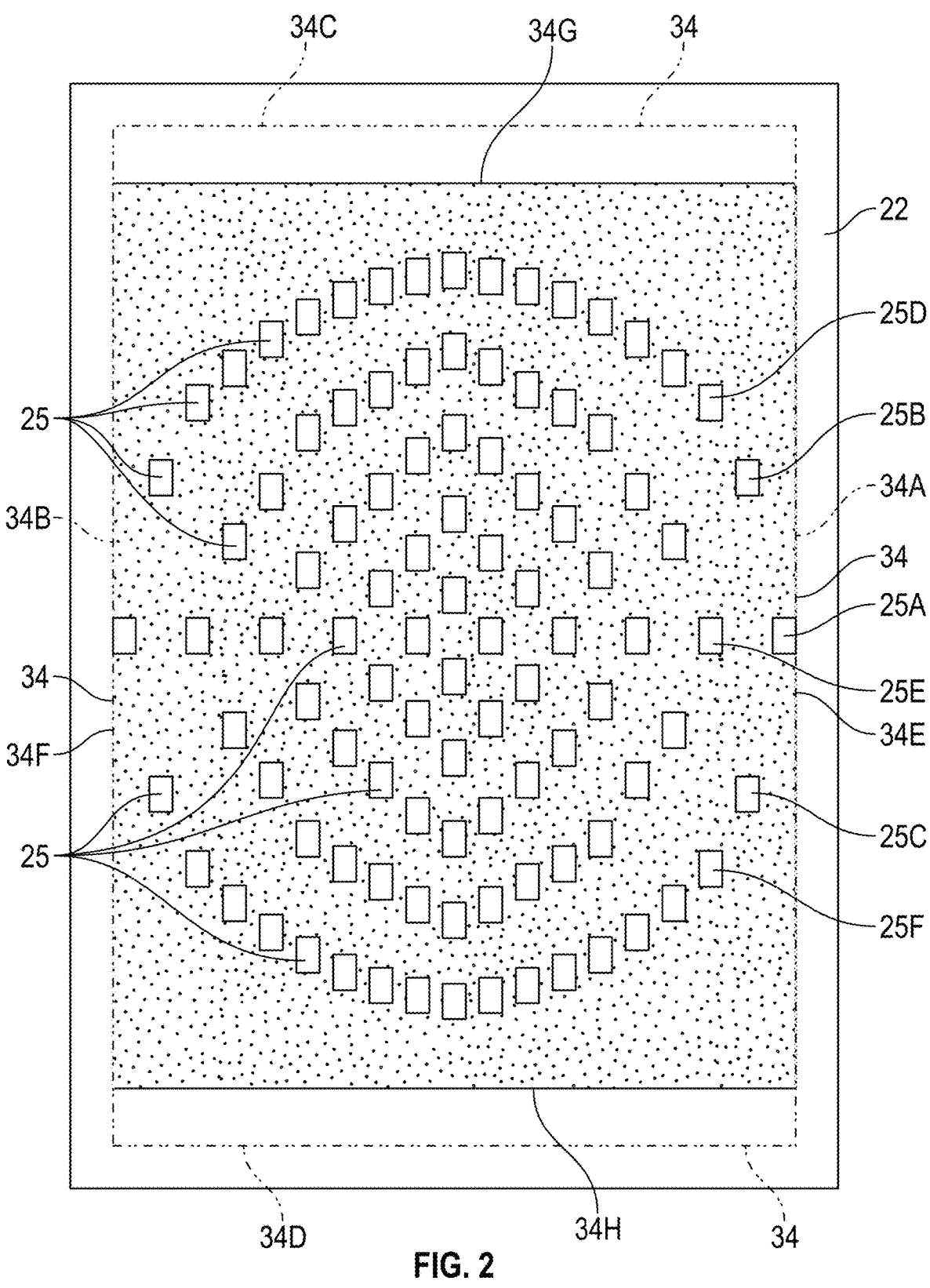
FIG. 2 is a plan view of an opposing side of the polymeric sheet of FIG. 1 with anti-weld material disposed thereon in a different pattern than on the side shown in FIG. 1.

FIG. 2 shows anti-weld material 24 disposed on an opposite side 22 (referred to herein as a first side 22) in a different predetermined pattern (referred to as a first predetermined pattern) than on the second side 26. Specifically, the first predetermined pattern shown in FIG. 2 leaves areas 25 uncovered by the anti-weld material 24. Only some of the areas 25 are indicated with a reference number in FIG. 2. The areas 25 are each a generally rectangular shape and are of identical size (e.g., identical width and identical length). In other embodiments, the areas left uncovered by the anti-weld material 24 may have different shapes and/or sizes.

As used herein, anti-weld material 24 may be blocker ink, and may also be referred to as anti-weld ink. For example, when the anti-weld material is blocker ink, it may be printed according to a different predetermined programmed pattern for each side 22, 26 of the polymeric sheet 10 at all selected locations where bonds of the polymeric sheet 10 to barrier sheets 16, 18, described herein, are not desired. When bonded to one another such as by thermal processing, the stacked, flat polymeric sheet 10 and barrier sheets 16, 18 create bonds between adjacent sheets on all adjacent sheet surfaces except where the anti-weld material 24 is disposed. Accordingly, the patterns of anti-weld material 24 determine corresponding patterns of resulting bonds in the finished cushioning component 14.

Figure 3:
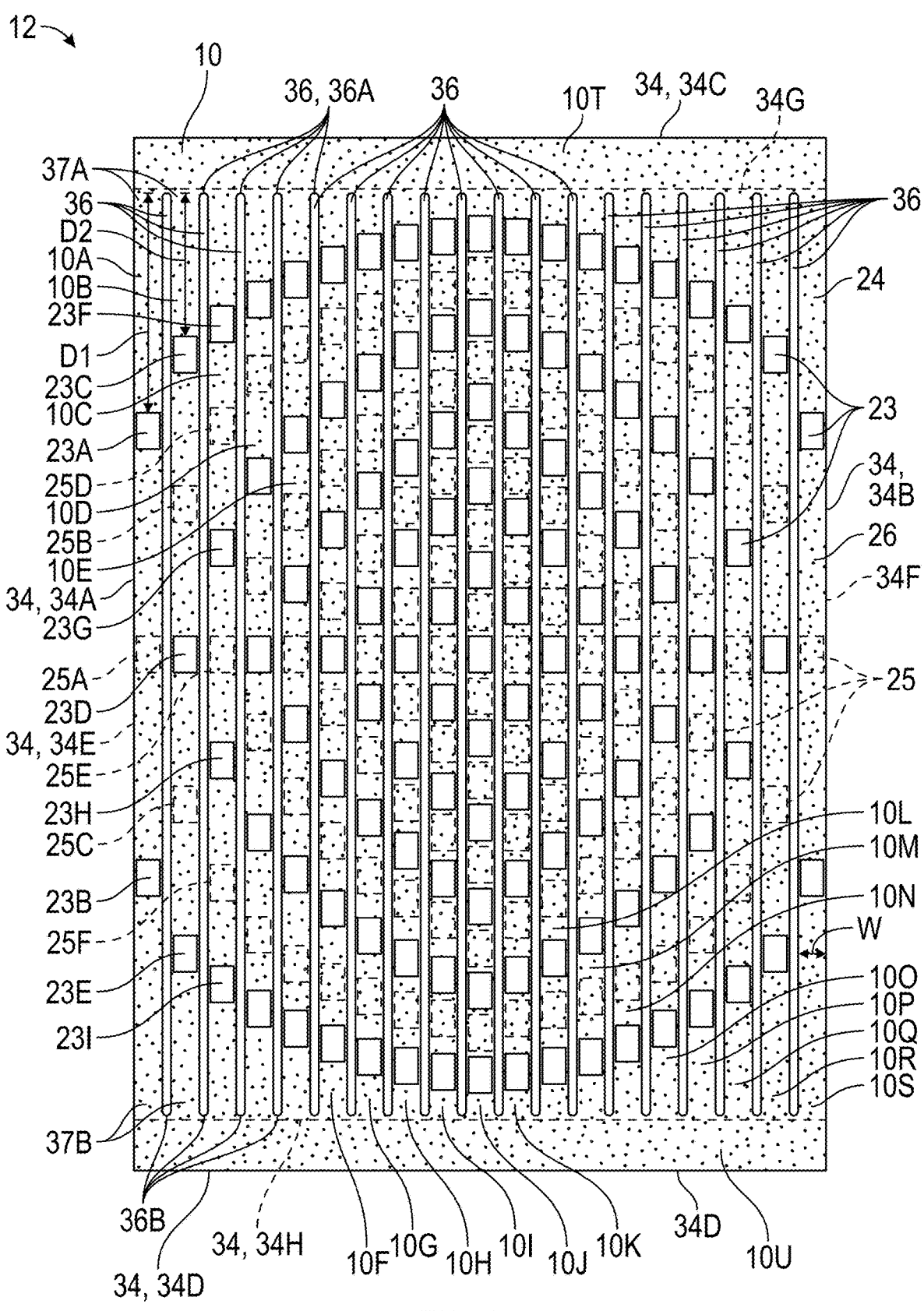
FIG. 3 is a plan view of the side of the polymeric sheet shown in FIG. 1 with spaced slots cut through the polymeric sheet to define strips bordering the slots, and indicating the areas on the opposing side that are not covered by anti-weld material in dashed lines.

As shown, the first predetermined pattern of anti-weld material 24 has a first edge 34E that corresponds with and falls along the first edge 34A of the opposing side 26, a second side edge 34F that corresponds with and falls along the second edge 34B of the second side 26, a third edge 34G that is displaced from and closer to the center of the polymeric sheet 10 than the third edge 34C of the opposing second side 26, and a fourth edge 34H that is displaced from and closer to the center of the polymeric sheet 10 than the fourth edge 34D on the second side 26. The edges 34E and 34F are opposite from one another and the edges 34G and 34H are opposite from one another. The edges 34A, 34B, 34C, 34D, 34E, and 34F may also be referred to as side edges herein as they fall along the outer perimeter 34 of the core 12 after trimming the polymeric sheet 10, as shown in FIG. 3. The edge 34A may be referred to as a first side edge and the edge 34B may be referred to as a second side edge.

FIG. 3 shows the second side 26 of the polymeric sheet 10 after trimming the polymeric sheet to the outer perimeter 34 (e.g., to edges 34A, 34B, 34C and 34D at the anti-weld material 24) to define the core 12. In addition to trimming at the outer perimeter 34, a plurality of spaced slots 36 are cut through the polymeric sheet 10 (e.g., the slots 36 extend entirely through the polymeric sheet 10 from the first side 22 to the second side 26). In the example shown in FIG. 3, the slots 36 are linear and extend parallel to the opposing first and second side edges 34A, 34B of the core 12.

The slots 36 create a plurality of strips 10A, 10B, 10C, 10D, 10E, 10F, 10G, 10H, 10I, 10J, 10K, 10L, 10M, 10N, 10O, 10P, 10Q, 10R, and 10S. The strips 10A-10S border the slots 36 and are decoupled from one another at the slots 36. Stated differently, there is a slot 36 between each adjacent pair of strips. For example, there is a slot 36 between strips 10A and 10B, a slot 36 between strips 10B and 10C, a slot 36 between strips 10C and 10D, a slot 36 between strips 10D and 10E, a slot 36 between strips 10E and 10F, a slot 36 between strips 10F and 10G, a slot 36 between strips 10G and 10H, a slot 36 between strips 10H and 10I, a slot 36 between strips 10I and 10J, a slot 36 between strips 10J and 10K, a slot 36 between strips 10K and 10L, a slot 36 between strips 10L and 10M, a slot 36 between strips 10M and 10N, a slot 36 between strips 10N and 10O, a slot 36 between strips 10O and 10P, a slot 36 between strips 10P and 10Q, a slot 36 between strips 10Q and 10R, and a slot 36 between strips 10R and 10S. As shown, each of the slots 36 is of a constant width and each of the strips 10A-10S is of a constant width. In other words, each strip 10A-10S remains a constant width W (indicated in FIG. 3 with respect to the strip 10S) between an end of the strip adjacent to the first ends 36A of the slots 36 and an end of the strip adjacent the second ends 36B of the slots 36. In other examples, one or more of the slots 36 and/or one or more of the strips 10A-10S may vary in width.

Each of the slots 36 has a first end 36A and a second end 36B. Only some of the ends 36A, 36B are labelled in FIG. 3 for clarity in the drawing. The first end 36A and the second end 36B are inward of the outer perimeter 34. Stated differently, the first end 36A is closer to the center of the polymeric sheet 10 (which is half-way between the ends 36A, 36B) than is the edge 34C such that an end portion 10T of the polymeric sheet 10 remains between the first ends 36A and the edge 34C after cutting the slots 36. The second end 36B is closer to the center of the polymeric sheet 10 than is the edge 34D such that an end portion 10U remains between the second ends 36B and the edge 34D after cutting the slots 36. Because the first and second ends 36A, 36B are inward of the outer perimeter 34 (e.g., inward of edges 34C and 34D, respectively), after cutting the slots 36, the polymeric sheet 10 still remains a single piece (including all of the strips 10A-10S and the end portions 10T and 10U) for relatively easy handling during manufacturing in comparison to handling and aligning multiple polymeric sheets that would result if the ends 36A and 36B extended to the respective edges 34C and 34D. Stated differently, the strips 10A-10S are decoupled from one another at the slots 36, but all of the strips are 10A-10S joined to and integral with the end portions 10T and 10U. In other examples, the slots 36 could extend to the edge 34C and/or to the edge 34D. In the example shown, there are eighteen slots 36 and nineteen strips 10A-10S. In other examples, the number of slots 36 may be fewer or more than eighteen. In one example, there may be only one slot 36, creating only two strips.

FIG. 3 shows the uncovered areas 23 on the second side 26 in solid lines and indicates the uncovered areas 25 on the first side 22 with dashed lines. The uncovered areas 25 become a plurality of first bonds 44 (also referred to as a first set of bonds 44) of the first side 22 of the core 12 to the inner surface 17 of the first barrier sheet 16, some of which are indicated in FIGS. 4-7. The pattern of first bonds 44 is the same as the pattern of the uncovered areas 25. The uncovered areas 23 become a plurality of second bonds 46 (also referred to as a second set of bonds) of the second side 26 of the core 12 to the inner surface 19 of the second barrier sheet 18, some of which are shown in FIGS. 4-7. The pattern of second bonds 46 is the same as the pattern of the uncovered areas 23.

It is apparent from FIG. 3 that the uncovered areas 23 of the second predetermined pattern on the second side 26 are at least partially offset from the uncovered areas 25 of the first predetermined pattern on the first side 22. Again, only some of the uncovered areas 23 and 25 are indicated with reference numbers in FIG. 3. In the embodiment shown, the uncovered areas 23 are entirely offset from the uncovered areas 25. In fact, along a length of each strip 10A-10S, the uncovered areas 23 alternate with the uncovered areas 25. As a result, the bonds 44 of the first set (e.g., the bonds of the first side 22 of the core 12 to the inner surface 17 of the first barrier sheet 16) alternate with the bonds 46 of the second set (e.g., the bonds of the second side 26 of the core 12 to the inner surface 19 of the second barrier sheet 18) as can be seen with respect to some of the strips indicated in FIGS. 4-6 and with hidden lines in FIG. 7. This manner of alternating may allow the finest level of control of the geometry (e.g., the curvature) of the outer surfaces 48, 50 of the first and second barrier sheets 16, 18 shown in FIGS. 4-7. The outer surface 48 of the first barrier sheet 16 is on the opposite side of the barrier sheet 16 from the inner surface 17. The outer surface 50 of the second barrier sheet 18 is on the opposite side of the barrier sheet 18 from the inner surface 19.

It is also apparent from FIG. 3 that the uncovered areas 23 (and therefore the resulting second bonds 46) between the edge 34A and the middlemost strip 10J are symmetrical with the uncovered areas 23 (and therefore the resulting second bonds 46) between the edge 34B and the middlemost strip 10J. The same is true for the uncovered areas 25 and the resulting first bonds 44.

With reference again to FIG. 3, for purposes of discussion and comparison, the strip 10A may be referred to as a first strip and the strip 10B may be referred to as a second strip that is adjacent to the first strip 10A. The first strip 10A has two uncovered areas 23A and 23B spaced apart from one another along the length of the first strip 10A at the second side 26. The first strip 10A has only one uncovered area 25A along the length of the first strip 10A on the first side 22. The uncovered area 25A is disposed between the uncovered areas 23A and 23B but on the opposing second side 26. There will be one bond 44 of the first strip 10A to the first barrier sheet 16 and two bonds 46 of the first strip 10A to the second barrier sheet 18 with the bond 44 between the bonds 46, as shown in FIG. 4.

The second strip 10B has three uncovered areas 23C, 23D, and 23E spaced apart from one another along the length of the second strip 10B at the second side 26. The second strip has two uncovered areas 25B and 25C spaced apart from one another along the length of the second strip 10B on the opposing first side 22. The uncovered area 25B is disposed between the uncovered areas 23C and 23D along the length of the second strip 10B but on the opposing first side 22. The uncovered area 25C is disposed between the uncovered areas 23D and 23E along the length of the second strip 10B but on the opposing first side 22. The two resulting second bonds 46 of the first strip 10A to the inner surface 19 of the second barrier sheet 18 (e.g., at uncovered areas 23A and 23B) will thus alternate with the one resulting first bond 44 of the first strip 10A to the inner surface 17 of the first barrier sheet 16 (e.g., at uncovered area 25A). Similarly, the two resulting first bonds 44 of the second strip 10B to the inner surface 17 of the first barrier sheet 16 (e.g., at uncovered areas 25B and 25C) will thus alternate with the three resulting second bonds 46 of the second strip 10B to the inner surface 19 of the second barrier sheet 18 (e.g., at uncovered areas 23C, 23D, and 23E).

Each strip has a first end 37A and a second end 37B, only some of which are labelled in FIG. 3. The first end 37A is between the first ends 36A of the two adjacent slots 36 for strips 10B-10R, or for the strips 10A and 10Q at the side edges 34A and 34B, respectively, adjacent to the ends 36A and 36B of the one adjacent slot 36. The uncovered area 23A on the second side 26 of the first strip 10A nearest the first end 37A of the first strip 10A is a distance D1 from the first end 37A of the first strip 10A. In comparison, the uncovered area 23C on the second side 26 of the second strip 10B that is nearest to the first end 37A of the second strip 10B is a distance D2 from the first end 37A. The distance D2 is less than the distance D1.

Similarly, a distance from the uncovered area 25A on the first side 22 of the first strip 10A to the first end 37A of the first strip 10A is greater than a distance from the uncovered area 25B on the first side 22 of the second strip 10B to the first end 37A of the second strip 10B. In fact, for strips between the edge 34A and the middlemost strip 10J (e.g., strips 10A-10I), the distance from the first end 37A of each strip 10A-10I to the nearest uncovered area 23 on the second side 26 of the strip and to the nearest uncovered area 25 on the first side 22 of that strip is greater the closer the strip is to the edge 34A and the further the strip is from the middlemost strip 10J. Similarly, for strips between the edge 34B and the middlemost strip 10J (e.g., strips 10K-10S), the distance from the first end 37A of each strip 10K-10S to the nearest uncovered area 23 on the second side 26 of that strip and to the uncovered area 25 on the first side 22 of that strip is greater the closer the strip is to the edge 34B and the further the strip is from the middlemost strip 10J.

The same is true with respect to the relative distances of the uncovered areas 23 and 25 from the second ends 37B. That is, for strips between the edge 34A and the middlemost strip 10J (e.g., strips 10A-10I), the distance from the second end 37B of each strip 10A-10I to the nearest uncovered area 23 on the second side 26 of that strip and to the nearest uncovered area 25 on the first side 22 of that strip is greater the closer the strip is to the edge 34A and the further the strip is from the middlemost strip 10J. Similarly, for strips between the edge 34B and the middlemost strip 10J (e.g., strips 10K-10S), the distance from the second end 37B of each strip 10K-10S to the nearest uncovered area 23 on the second side 26 and to the nearest uncovered area 25 on the first side 22 of that strip is greater the closer the strip is to the edge 34B and the further the strip is from the middlemost strip 10J. This placement of the uncovered areas 23 and 25 relative to the first and second ends 37A and 37B creates an arced arrangement of the uncovered areas 25 and 23 and the resulting bonds 44 and 46, respectively, closest to the ends 37A and 37B, as is evident in FIG. 3.

The geometry of the outer surfaces 48 and 50 of the respective barrier sheets 16 and 18 will be affected by this placement of uncovered areas 23 and 25 as the barrier sheets 16 and 18 will be tethered closer to one another by the core 12 gradually in a direction from the edge 34A toward the middlemost strip 10J and in a direction from the edge 34B toward the middlemost strip 10J. Additionally, the barrier sheets 16, 18 will be held closer to one another by the bonds 44 and 46 near the middle of the core 12 between the edges 34C and 34D (e.g., at a row of uncovered areas including uncovered area 25A and uncovered area 23D in FIG. 3).

A desired geometry at the outer surface 48 and 50 is also affected by utilizing different spacing between adjacent uncovered areas 23 or 25 and resulting bonds 44 or 46 on different ones of the strips 10A-10S. For purposes of discussion and comparison of this example, the strip 10B will now be referred to as a first strip and the strip 10C will be referred to as a second strip. The strip 10B has two uncovered areas 25B and 25C on the first side 22 and three uncovered areas 23C, 23D, and 23E on the second side 26. The strip 10C has three uncovered areas 25D, 25E, and 25F on the first side 22 and four uncovered areas 23F, 23G, 23H, and 23I on the second side 26. The uncovered areas 25B and 25C are spaced slightly further from one another than the uncovered areas 25D and 25E are from one another, and slightly further than one another than the uncovered areas 25E and 25F are from one another. Similarly, the uncovered areas 23C and 23D on the second side 26 of the strip 10B are spaced further than one another than the uncovered areas 23F and 23G are from one another on the second side 26 of the strip 10C. The uncovered areas 23D and 23E have the same spacing as uncovered areas 23C and 23D, which is further than the spacing between uncovered areas 23F and 23G, and the spacing between uncovered areas 23G and 23H, and uncovered areas 23H and 23I. The strip 10B is closer to the outer perimeter 34 (at edge 34A) of the core 12 than the strip 10C, and the uncovered areas 23, 25 on the respective sides 26, 22 of the strip 10B are further apart from one another than uncovered areas 23, 25 on the respective sides 26, 22 of the strip 10C. Specifically, as shown in FIG. 3, the number of uncovered areas 23 (and resulting second bonds 46) and the number of uncovered areas 25 (and resulting first bonds 44 on each strip) increases in order in a direction away from each of the side edges 34A, 34B such that the strips closer to the side edges 34A or 34B have a fewer number of the resulting bonds 44 and 46 than the strips further from the side edges (e.g., strips closer to middlemost strip 10J have a greater number of bonds 44 and 46 than strips further from the middlemost strip 10J). The first and second barrier sheets 16, 18 are thus held closer to one another by the core 12 at the strip 10C than at the strip 10B, for example, creating a depression at the outer surfaces 48 and 50 of the bladder 20 from the strip 10B to the second strip 10C (and, more expansively, from the side edges 34A, 34B to the middlemost strip 10J).

Figure 7:
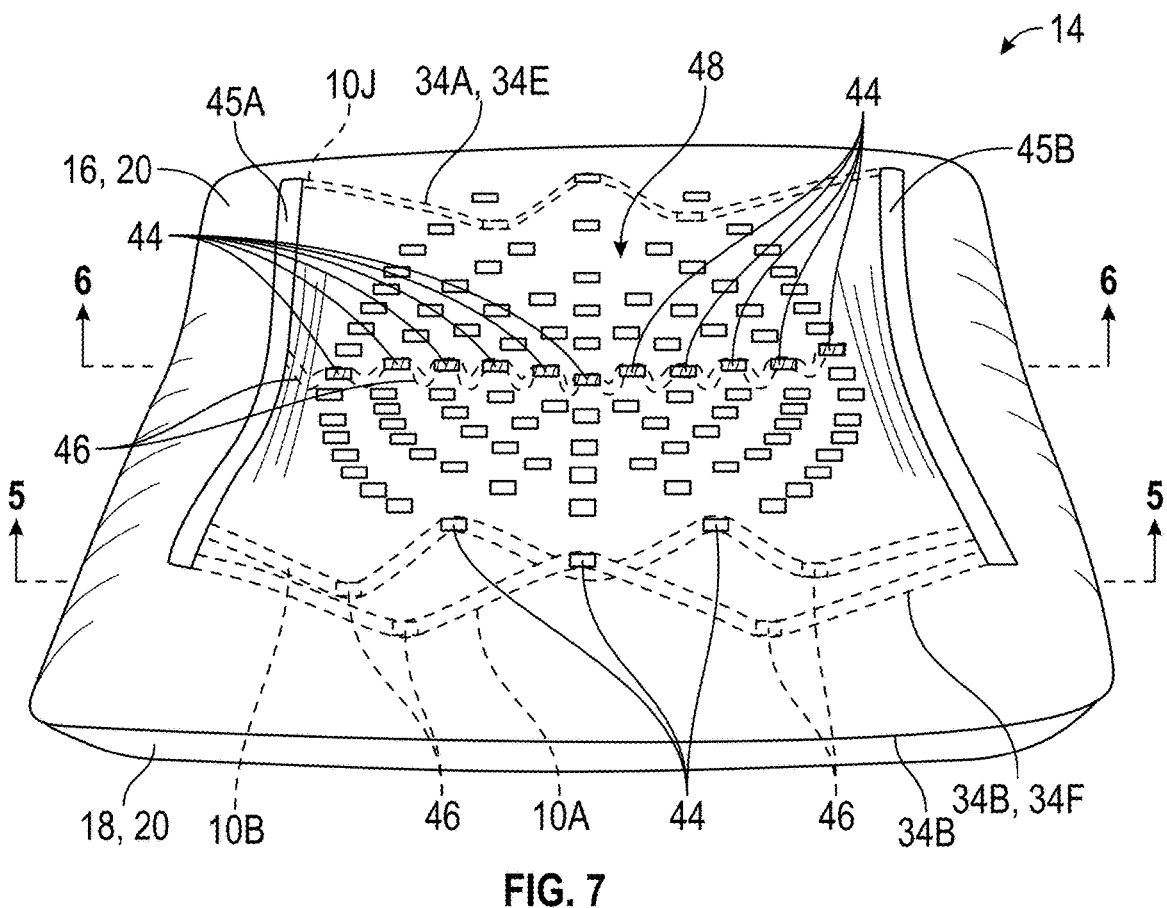
FIG. 7 is a perspective view of the cushioning component of FIGS. 4-6 in the inflated state.

FIG. 4 illustrates the cushioning component 14 of FIG. 7 taken at a cross-section through the first strip 10A when the core is placed between the first and second barrier sheets 16, 18. When bonded to one another such as by thermal processing, bonds are created between adjacent surfaces of the stacked, flat polymeric sheet 10 of the core 12 and barrier sheets 16, 18 except where the anti-weld material 24 is disposed. This placement of the patterns of the anti-weld material 24 relative to the outer perimeter 34 as well as placing the core 12 so that the entire outer perimeter 34 is entirely inward of a peripheral bond 38 at which the first barrier sheet 16 is bonded to the second barrier sheet 18 ensures that the core 12 will tether the first and second barrier sheets 16 and 18 without creating any sealed chambers that are not in fluid communication with the interior cavity 21. FIG. 4 shows the edges 34D and 34C of the core 12 inward of the peripheral bond 38. The core 12 will thus collapse to return toward the flat state under dynamic compressive loading of the cushioning component 14 and acts as a tether to control and vary the distance between the respective inner surfaces 17, 19 of the barrier sheets 16, 18 without affecting the ability of the bladder 20 to compress under loading.

Traditional tensile components may include a first polymeric sheet bonded only to the inner surface of the first barrier sheet, a second polymeric sheet bonded only to the inner surface of the second barrier sheet, and a plurality of tethers extending from the first polymeric sheet to the second polymeric sheet. Due to this configuration, such traditional tensile components are not relatively flat or sheet-like prior to inflating the interior cavity of a bladder in which they are disposed and are not amendable to heat pressing either to create a core of multiple polymeric sheets or to bond a core of a single polymeric sheet or multiple polymeric sheets to the inner surfaces of the barrier sheets.

The barrier sheets 16, 18 of the bladder 20 can be formed from a variety of materials including various polymers that can resiliently retain a fluid such as air or another gas. The polymeric sheet 10 may be formed of the same material or materials as the barrier sheets 16, 18 as described herein, or may be formed of a polymeric material that does not necessarily retain fluid, as, unlike the barrier sheets 16, 18, the polymeric sheet 10 functions as a tether but does not seal any interior cavity. Examples of polymeric materials for the barrier sheets 16, 18 and the polymeric sheet 10 can include thermoplastic urethane, polyurethane, polyester, polyester polyurethane, and polyether polyurethane. Moreover, the barrier sheets 16, 18 and the polymeric sheet 10 can be formed of layers of different materials. In one embodiment, the barrier sheets 16, 18 and/or the polymeric sheet 10 is formed from thin films having one or more thermoplastic polyurethane layers with one or more barrier layers of a copolymer of ethylene and vinyl alcohol (EVOH) that is impermeable to the pressurized fluid contained therein as disclosed in U.S. Pat. No. 6,082,025, which is incorporated by reference in its entirety. The barrier sheets 16, 18 and the polymeric sheet 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The barrier sheets 16, 18 and the polymeric sheet 10 may also be a flexible microlayer membrane that includes alternating layers of a gas barrier material and an elastomeric material, as disclosed in U.S. Pat. Nos. 6,082, 025 and 6,127,026 to Bonk et al. which are incorporated by reference in their entireties. Additional suitable materials for the barrier sheets 16, 18 and the polymeric sheet 10 are disclosed in U.S. Pat. Nos. 4,183,156 and 4,219,945 to Rudy which are incorporated by reference in their entireties. Further suitable materials for the barrier sheets 16, 18 and the polymeric sheet 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the barrier sheets 16, 18 and the polymeric sheet 10, engineering properties such as tensile strength, stretch properties, fatigue characteristics, dynamic modulus, and loss tangent can be considered. The thickness of the barrier sheets 16, 18 and the polymeric sheet 10 can be selected to provide these characteristics.

The core 12 is inverted in FIG. 4 relative to its position in FIG. 3 so that the first side 22 is facing upward, and the edge 34D is shown at the left. The uncovered area between the edge 34D and the edge 34H on the first side 22 becomes a bond 45A shown in FIG. 4. The uncovered area between the edge 34C and the edge 34G on the first side 22 becomes a bond 45B shown in FIG. 4.

As can be seen in FIG. 4, the first predetermined pattern of the anti-weld material 24 on the first side 22 of the polymeric sheet 10 is disposed against the inner surface 17 of the first barrier sheet 16, and the second predetermined pattern of the anti-weld material 24 on the second side 26 of the polymeric sheet 10 is disposed against the inner surface 19 of the second barrier sheet 18. Portions of one or both of the inner surfaces 17, 19 that are outward of the outer perimeter 34 of the core 12 and inward of where the peripheral bond 38 is formed may also be preprinted with anti-weld material 24 or otherwise processed so that these portions of the inner surfaces 17, 19 will not bond to one another.

A first pattern of bonds 44 is formed at the interfacing areas of the first side 22 of the polymeric sheet 10 and the inner surface 17 of the first barrier sheet 16 (e.g., at all of the uncovered areas 25 where there is not anti-weld material 24 between the first side 22 and the inner surface 17). A second pattern of bonds 46 is formed at the interfacing areas of the second side 26 of the polymeric sheet 10 and the inner surface 19 of the second barrier sheet 18 (e.g., at all of the uncovered areas 23 where there is not anti-weld material 24 between the second side 26 and the inner surface 19). The anti-weld material 24 prevents bonding at any interfacing areas where it is disposed. As can be seen in FIG. 4, the core 12 lays flat within the bladder 20 with the unbonded areas (areas at anti-weld material 24) contacting the opposing inner surfaces 17, 19 when the interior cavity 21 of the bladder 20 is uninflated.

FIG. 5 is a cross-sectional view of the cushioning component 14 of FIG. 5 in an inflated state. Inflating the interior cavity 21 causes the polymeric sheet 10 to be tensioned between the barrier sheets 16, 18 and move from the relatively flat state of FIG. 4 to the relatively extended state of FIG. 5. A small portion of the peripheral bond 38 may initially be left open to permit inflation of the interior cavity 21 with gas, such as air or nitrogen, and then may be sealed after inflation to completely enclose the interior cavity 21, retaining the gas in the interior cavity 21, or a fill tube may extend through the peripheral bond 38 that may then be plugged after inflation, as is understood by those skilled in the art.

By placing the unbonded areas, and hence the resulting bonds at different distances from the ends of the respective strips, different numbers along each strip, and at different spacings along each strip, a desired geometry of the outer surface of the bladder near the ends of the core can be achieved. For example, the resulting cushioning component 14 formed by the core 12 and the barrier sheets 16, 18 of the bladder 20 will thus have a gradual depression in a direction from the edge 34C toward the middlemost row at bonds 44, 46 at uncovered areas 25A, 23D, for example, in a direction from the edge 34D toward the middlemost row. The cushioning component 14 will also have a gradual depression in a direction from the edge 34A toward the middlemost strip 10J and from the edge 34B toward the middlemost strip 10J. Stated differently, the resulting cushioning component 14 will have a concavity in both a direction along a length of the cushioning component 14 and along a width of the cushioning component 14 and on both the foot-facing and distal sides (e.g., at both outer surfaces 48, 50). Either surface 48 or 50 could thus serve as a heel cup, for example, conforming to the convex outer surface of a wearer's heel. When oriented with the outer surface 59 at the foot-facing side, outer surface 59 serves as a heel cup.

FIG. 6 shows the cushioning component 14 of FIG. 7 taken at lines 6-6 in FIG. 7, which is along the middlemost strip 10J. It is apparent in a comparison of FIGS. 5 and 6 that the overall height H1 of the cushioning component 14 at the strip 10A is greater than the overall height H2 of the cushioning component 14 at the middlemost strip 10J. The greater number of bonds 44 and 46 (only some of which are labelled) along the strip 10J tethers the barrier sheets 16 and 18 closer to one another than do the fewer number of bonds along the strip 10A. Tension of the strip 10A due to the inflation of the interior cavity 21 causes the outer surfaces 48 and 50 to be pulled inward at the bonds 44 and 46, resulting in a wavy outer surface 48 and 50 outward of the strip 10A. In contrast, the greater number of bonds 44, 46 that are closer together to one another along the strip 10J results in relatively flat outer surfaces 48 and 50 outward of strip 10J. The pattern of anti-weld material 24 printed on the polymeric sheet 10 and the resulting patterns of bonds 44, 46 of the polymeric sheet 10 of the core 12 to the barrier sheets 16, 18 can thus be selected to control the resulting contours of the outer surfaces 48, 50 of the barrier sheets 16, 18.

Figure 8:
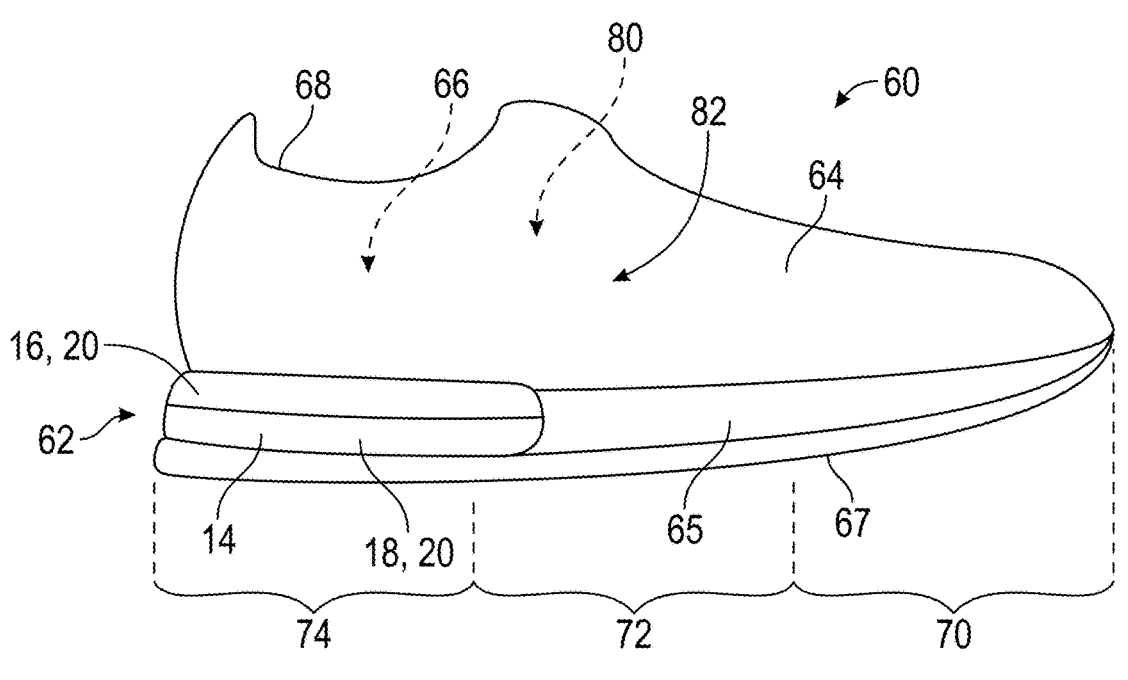
FIG. 8 is a lateral side view of an article of footwear showing the cushioning component of FIG. 7 disposed in a heel region of a sole structure.

Referring to FIG. 8, in an implementation in which the wearable article is an article of footwear 60, the cushioning component 14 may be included in a sole structure 62 of the article of footwear 60. More specifically, the article of footwear 60 includes a footwear upper 64 secured to the sole structure 62 and generally extending above the sole structure 62 to define a foot-receiving cavity 66 and an ankle opening 68 for accessing the foot-receiving cavity 66. The article of footwear 60 includes a forefoot region 70, a midfoot region 72, and a heel region 74. The forefoot region 70 generally includes portions of the article of footwear 60 corresponding with the toes and the joints connecting the metatarsals with the phalanges of a wearer's foot. The midfoot region 72 generally includes portions of the article of footwear 60 corresponding with the arch area of the foot, and the heel region 74 corresponds with rear portions of the foot, including the calcaneus bone. Each of the sole structure 62, the footwear upper 64, and the article of footwear 60 include a medial side 80 and a lateral side 82 that extend through each of forefoot region 70, the midfoot region 72, and the heel region 74 and fall on opposite sides of a longitudinal midline (e.g., longitudinal axis) of the article of footwear 60 in FIG. 8. The forefoot region 70, the midfoot region 72, the heel region 74, the medial side 80, and the lateral side 82 are not intended to demarcate precise areas of the article of footwear 60, but are instead intended to represent general areas of the article of footwear 60, to aid in the discussion.

By disposing the cushioning component 14 in the heel region 74, the concave depression at the outer surface 48 of the first barrier sheet 16 serves as at least a portion of a footbed for a foot disposed in the foot-receiving cavity 66 and resting on the sole structure 62. More specifically, the cushioning component 14 serves as a heel cup. A foam midsole layer 65 is shown extending forward of the cushioning component 14 in the midfoot region 72 and the forefoot region 70, and an outsole 67 is shown extending under each of the foam midsole layer 65 and the cushioning component 14.

Figure 9:
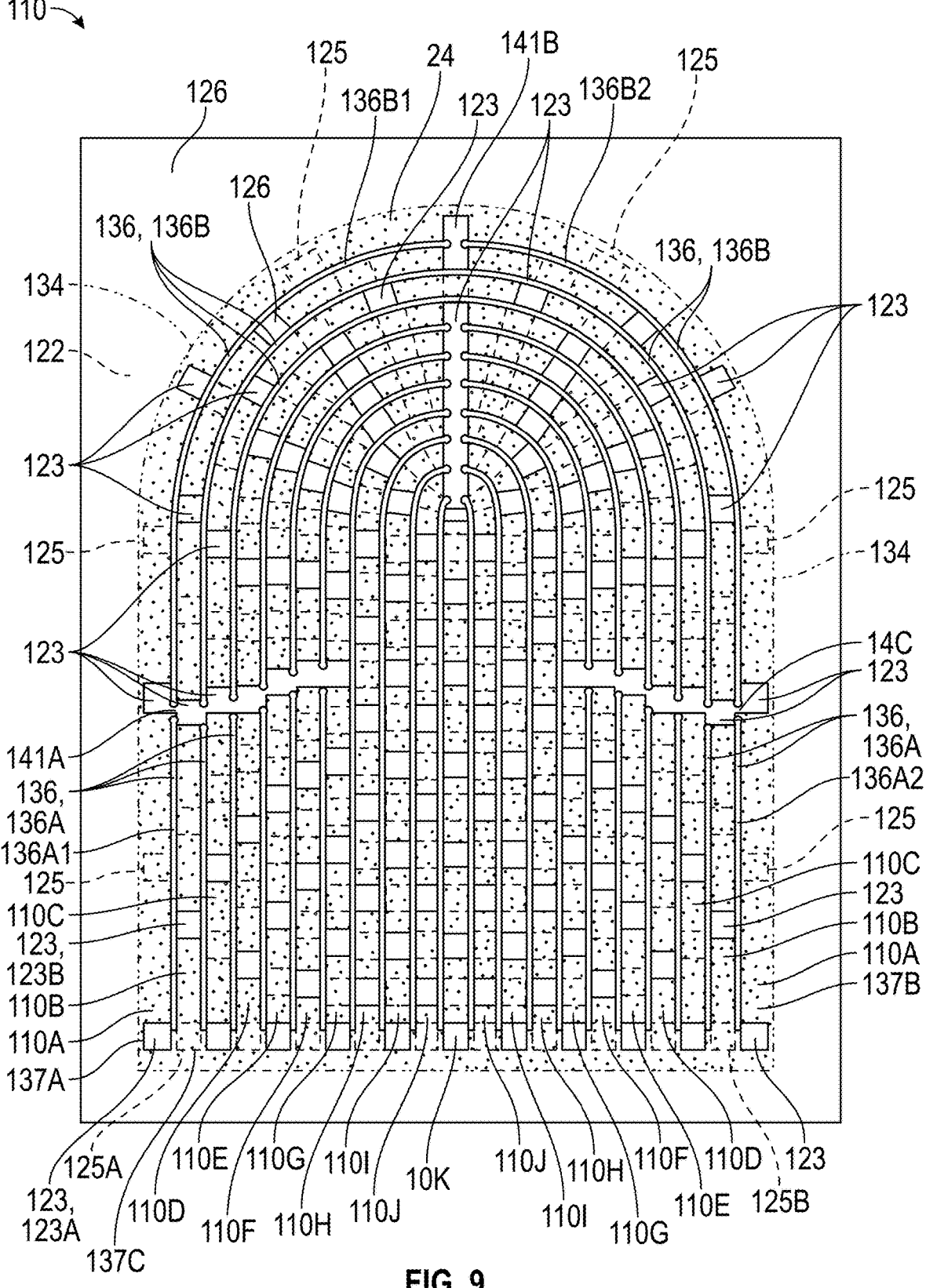
FIG. 9 is a plan view of a side of another polymeric sheet with anti-weld material disposed in a pattern thereon, showing spaced slots extending through the polymeric sheet to define strips bordering the slots, and indicating the areas on the opposing side that are not covered by anti-weld material in dashed lines.
Figure 10:
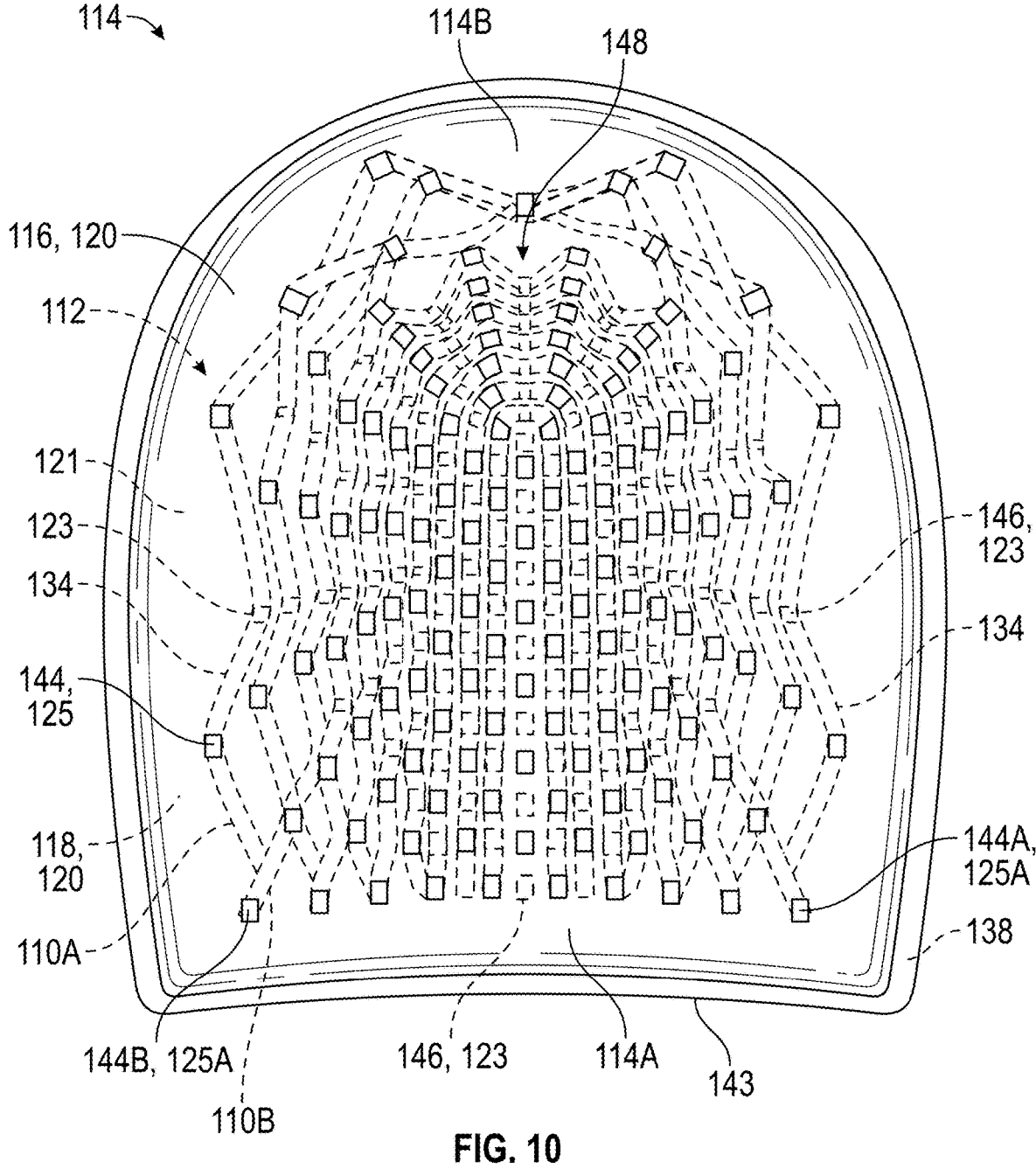
FIG. 10 is a plan view of a cushioning component in an inflated state and configured for use in a heel region of a sole structure of an article of footwear, including the polymeric sheet of FIG. 9 as a core disposed between and bonded to opposing inner surfaces of first and second barrier sheets of a bladder.
Figure 11:
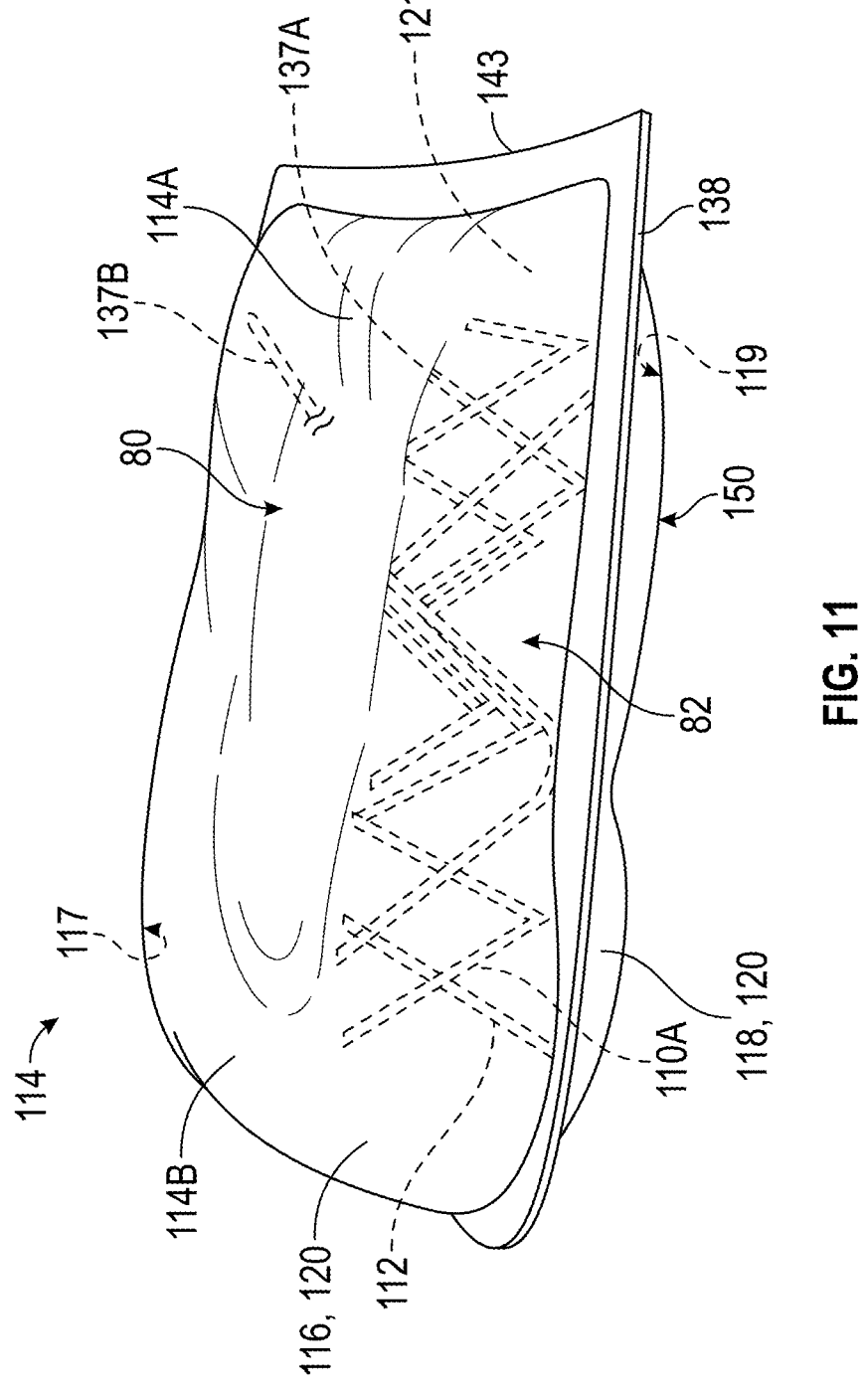
FIG. 11 is a perspective view of the cushioning component of FIG. 10 in the inflated state and indicating some of the strips of the core in dashed lines.

FIG. 9 is a plan view of a second side 126 of a polymeric sheet 110 that, when trimmed at the perimeter 134 indicated in phantom, is a core 112 of a cushioning component 114 shown in FIG. 10, for example. The cushioning component 114 may also serve as a heel cup and may be used in place of the cushioning component 14 in the article of footwear 60 shown in FIG. 8. As best shown in FIG. 11, the cushioning component 114 includes a bladder 120 comprising a first barrier sheet 116 and a second barrier sheet 118 bonded to one another at a peripheral bond 138 to enclose an interior cavity 121 and retain a gas in the interior cavity 121. The cushioning component 114 includes the core 112 disposed within the interior cavity 121 of the bladder 120. The core 112 is a single polymeric sheet 110. The first barrier sheet 116, second barrier sheet 118, and the polymeric sheet 110 may comprise the same materials and have the same properties as described with respect to the corresponding first barrier sheet 16, second barrier sheet 18, and polymeric sheet 10 of the cushioning component 14.

Anti-weld material 24 is disposed on the second side 126 of the polymeric sheet 110 in a predetermined pattern that leaves a number of areas 123 uncovered by the anti-weld material 24. The anti-weld material 24 is indicated with shading and the uncovered areas 123 are shown without shading. Only some of the uncovered areas 123 are indicated with a reference number. The areas 123 are each a generally rectangular shape and are of identical size (e.g., identical width and identical length). In other embodiments, the areas left uncovered by the anti-weld material 24 may have different shapes and/or sizes. Similar to the polymeric sheet 10, the opposite side 122 of the polymeric sheet 110, referred to herein as a first side, also has anti-weld material 24 disposed thereon in a predetermined pattern different than the predetermined pattern on the second side 126. Areas left uncovered at the first side 122 that are within the perimeter 134 are indicated with dashed lines in FIG. 9, and may be referred to as uncovered areas 125, only some of which are numbered with a reference number in FIG. 9. The predetermined pattern of anti-weld material 24 on the first side 122 may be referred to as a first predetermined pattern, and the predetermined pattern of anti-weld material 24 on the second side 126 may be referred to as a second predetermined pattern.

Like the polymeric sheet 10, the polymeric sheet 110 is cut to have a plurality of spaced slots 136 extending through the polymeric sheet 110 from the first side 122 to the second side 126. The slots 136 create a plurality of strips 110A, 110B, 110C, 110D, 110E, 110F, 110G, 110H, 110I, 110J, and 110K. Many of the slots 136 are linear from their first end to their second end. Some of the linear slots 136 are labeled 136A. Others of the slots 136 are at least partially curved between their first and second ends. Some of the curved slots 136 are labelled 136B in FIG. 9. The curvature of the curved slots 136 follows the curved perimeter 134 of the core 112. Additionally, slots 136 that border opposite sides of a particular strip are parallel to one another so that the strip is of a constant width. Adjacent strips of the core 112 are only partially decoupled from one another. Stated differently, there are multiple slots 136 extending in a series between most of the adjacent strips in FIG. 9. For example, there are four slots 136 extending end to end between the outermost strip 110A and the next adjacent strip 110B. The outermost strip 110A may be referred to herein as a first strip and the next adjacent strip 110B may be referred to herein as a second strip. The outermost strip 110A has a first end 137A near a bottom left side of the perimeter 134 in FIG. 9 and a second end 137B at a bottom right side of the perimeter 134, with the strip 110A extending along the perimeter between the first end 137A and the second end 137B. The four slots 136 that border the outermost strip 110A and separate it from the next adjacent strip 110B are labelled 136A1, 136B1, 136B2, and 136A2 in FIG. 9.

The adjacent strips 110A and 110B are decoupled from one another along these slots 136A1, 136B1, 136B2, and 136A2 but remain coupled to one another at three locations. Specifically, a portion of the polymeric sheet 110 is not cut between the end of the slot 136A1 and the adjacent end of the slot 136B1. Similarly, a portion of the polymeric sheet 110 is not cut between the other end of the slot 136B1 and the adjacent end of the slot 136B2. Finally, a portion of the polymeric sheet 110 is not cut between the other end of the slot 136B2 and the adjacent end of the slot 136A2. Accordingly, by using a series of discontinuous slots 136A1, 136B1, 136B2, and 136A2 between the first end 137A and the second end 137B of the strip 110A instead of a single slot extending from the first end 137A1 to the second end 137A2, the adjacent strips 110A and 110B are only partially decoupled form one another between their ends The polymeric sheet 110 effectively creates three small bridges 141A, 141B and 141C between the respective slots 136A1 and 136B1, 136B1 and 136B2 and 136B2 and 136A2, as shown in FIG. 9. By partially coupling adjacent strips to one another by the bridges, such as bridges 141A, 141B, and 141C, The relative positions of the strips during handling and before thermally processing the core 112 may enable greater case in handling and more accurate placement of the core 112 between the barrier sheets 116, 118 as the adjacent strips will have less ability to accidentally overlap with one another, for example.

Considering the uncovered areas 123 shown in FIG. 9, it is clear that a distance from the uncovered area 123A to the first end 137A of the first strip 110A is less than a distance from the first end 137C of the adjacent second strip 110B to the uncovered area 123B on the second strip 110B closest to the first end 137C. The outermost strip 110A has seven of the uncovered areas 123. The adjacent strip 110B has nine of the uncovered areas 123. Given that the strip 110B is inward of the strip 110A, the overall length of the strip 110B is less than that of the strip 110A. Because it has more uncovered areas 123 over a smaller length, the resulting bonds 146 of the second set of bonds 146 indicated in FIG. 10 will be closer to one another on the second strip 110B than on the first strip 110A. Similarly, the number of uncovered areas 125 on the first side 122 is fewer on the strip 110A than on the strip 110B such that there will be fewer resulting first bonds 144 of the first set of bonds 144 shown in FIG. 10 when the core 112 is placed between the barrier sheets 116, 118 and bonded to the opposing inner surface of the barrier sheet 116, 118. The barrier sheets 116 and 118 will be held closer to one another at the second strip 110B than at the first strip 110A. As is evident in FIGS. 9 and 10, the number of uncovered areas 123 and 125 and resulting bonds 144 and 146, respectively, on each strip increases the further the strip is from the outer perimeter 134, with the maximum number of uncovered areas 123 and 125 being on the strip 110J. A number of bonds 146 of each strip 110A-110J will align with the bonds of the innermost strip 110J as is apparent based on the uncovered areas 123 in FIG. 9. Accordingly, the barrier sheets 116 and 118 will be held closest to one another along the center of the core 112 at the strip 110K, with the distance between the inner surfaces of the barrier sheets 116 and 118 increasing toward the outer perimeter 134 of the core 112.

Figure 12:
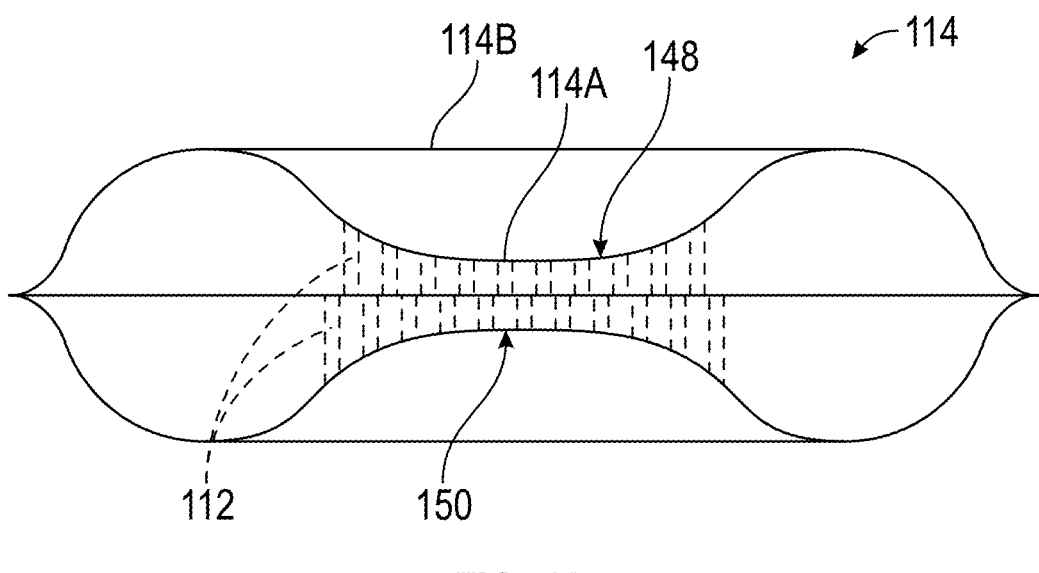
FIG. 12 is an end view of the cushioning component of FIG. 11 and indicating some of the strips of the core in dashed lines.
Figure 13:
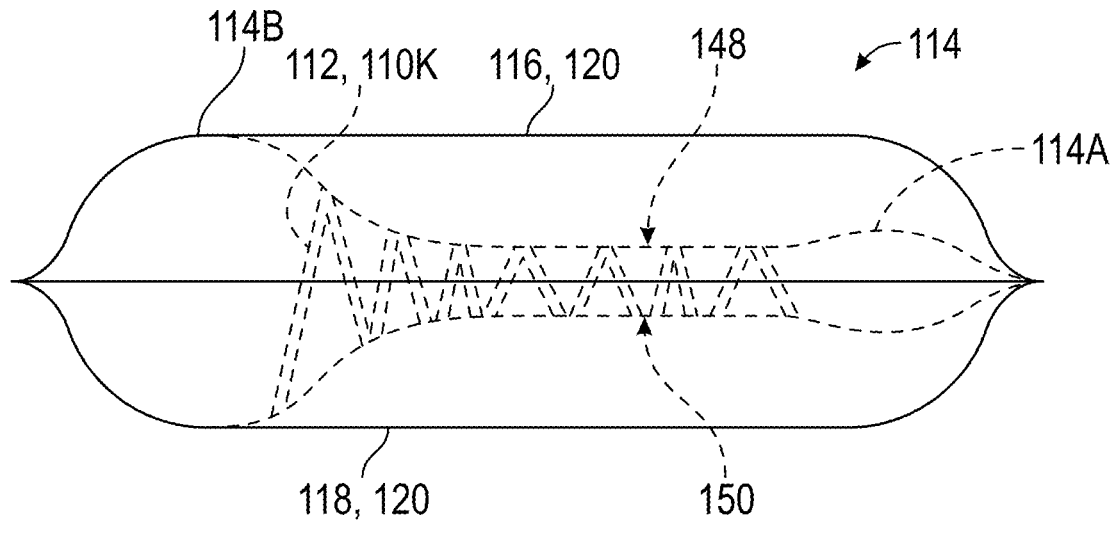
FIG. 13 is a side view of the cushioning component of FIG. 12.

FIG. 10 is a plan view of the cushioning component 114 in an inflated state including the polymeric sheet 110 of FIG. 9 trimmed along the outer perimeter 134 as a core 112 disposed between the inner surfaces 117, 119 of the barrier sheets 116, 118 and thermally processed to bond the uncovered areas 125, 123 to the opposing inner surfaces 117, 119 of the barrier sheets 116, 118 of the bladder 120 at bonds 144, 146, respectively. FIG. 11 is a perspective view of the cushioning component 114 of FIG. 10 in the inflated state and indicating some of the strips of the core 112 in dashed lines, such as strip 110A. FIG. 12 is an end view of the cushioning component 114 of FIG. 11, showing a front portion 114A having a lower height than a rear portion 114B at a middle of the cushioning component 114 (e.g., near the middle of the straight outer edge 143 of the cushioning component 114) and indicating the depression formed by the core 112 at the outer surfaces 148, 150 that serves as a heel cup. FIG. 13 is a side view of the cushioning component 114 of FIG. 11.

The additional number of bonds 144, 146 created toward the center of the core 112 and the pattern of the bonds along the curved strips creates a depression at the outer surface 148 of the first barrier sheet 116 (and a like depression at the outer surface 150 of the second barrier sheet 118) when the interior cavity 121 between the barrier sheets 116, 118 is inflated and a peripheral bond 138 sealed. Additionally, the adjacent alternating uncovered areas 123 and 125 at the ends of the slots 136 (e.g., near the bottom of the perimeter 134 in FIG. 9) results in the cushioning component 114 having a lesser height near the straight outer edge 143 shown in FIGS. 10 and 11 (e.g., near labeled resulting bonds 144A and 144B corresponding with uncovered areas 125A and 125B (e.g., the front portion 114A) than near the more curved portion of the perimeter 234 (e.g., near the top of the cushioning component 114 in FIG. 10. which is a rear portion 114B of the cushioning component as labeled in FIG. 11. This gives a lift to the heel region 74, a taller inflated portion around the depressed portion (e.g., between the outermost strip 110A and the peripheral bond 138, and a shorter portion near the front edge at a front of the depressed portion. A medial side 80 and a lateral side 82 of the cushioning component 114 indicated in FIG. 11 correspond with the medial and lateral sides 80, 82 in FIG. 8 when the cushioning component 114 is used in place of cushioning component 14 in the sole structure 62. Accordingly, the curved slots, such as slots 136B1 and 136B2, are arranged in a series that curves around the rear portion 114B of the cushioning component 114, which is the rear of the heel region 74, from the medial side 80 to the lateral side 82 when incorporated into the sole structure 62.

Figure 15:
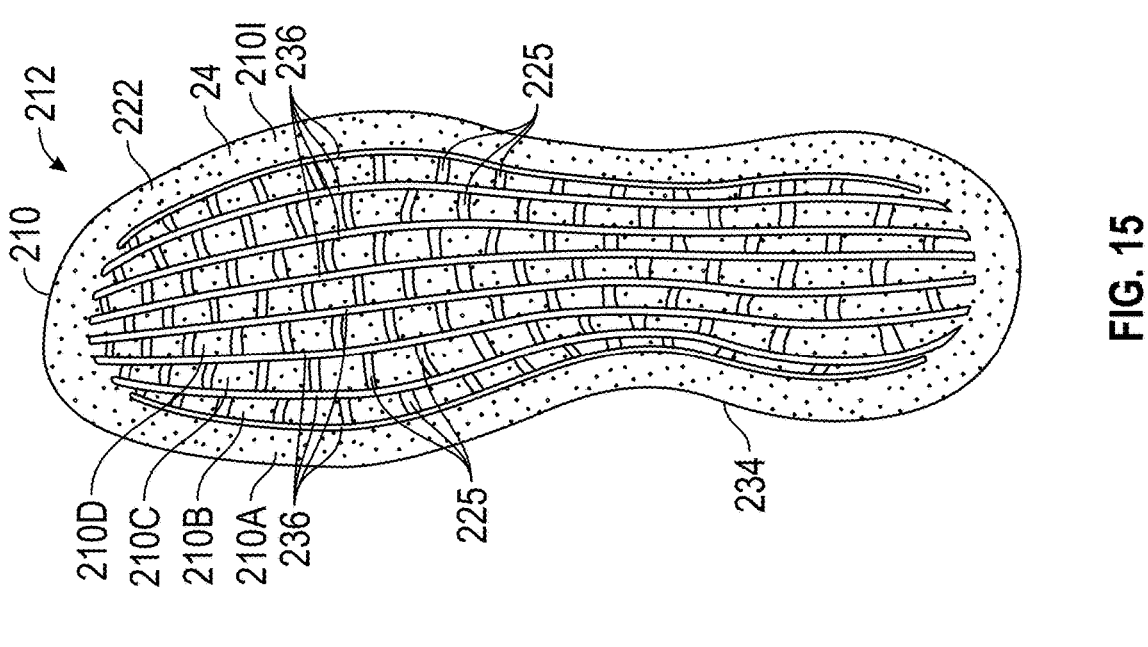
FIG. 15 is a plan view of an opposing side of the polymeric sheet of the core of FIG. 14 with anti-weld material disposed thereon in a different pattern than on the side shown in FIG. 14.
Figure 14:
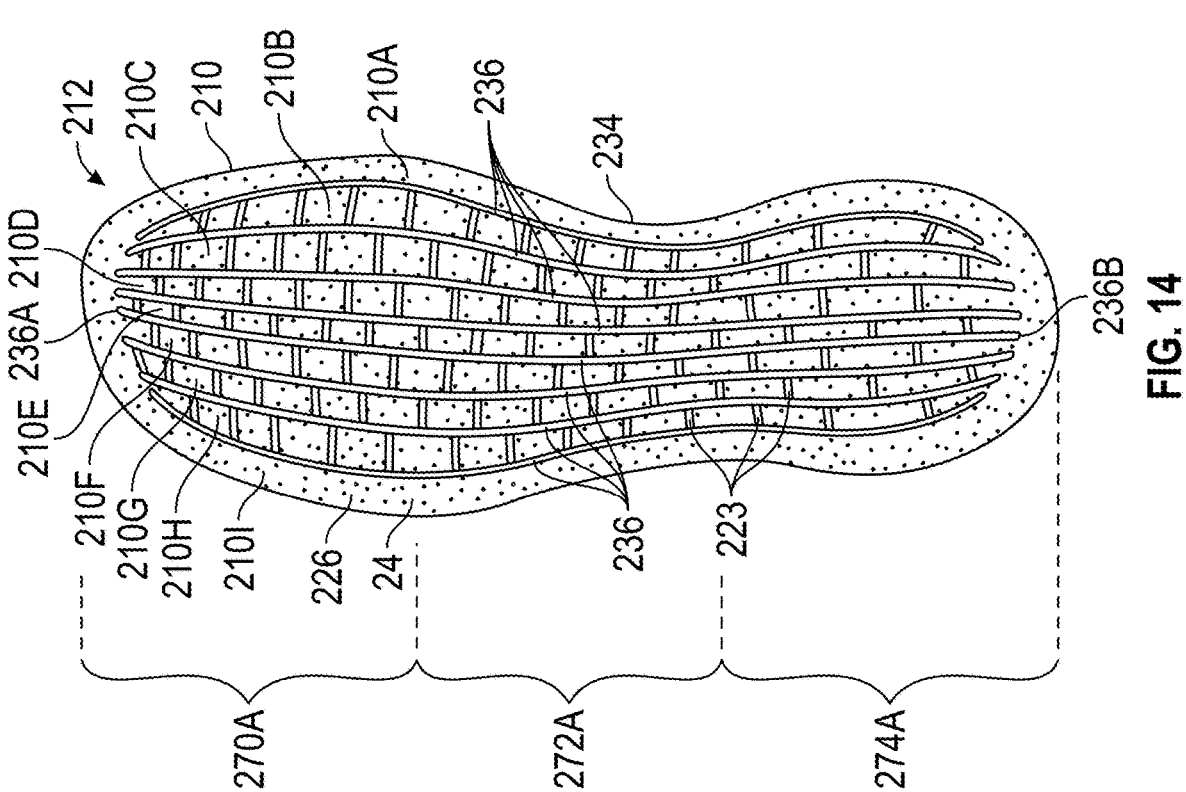
FIG. 14 is a plan view of a side of a core trimmed from a polymeric sheet with anti-weld material disposed in a pattern thereon, and showing spaced slots extending through the sheet to define strips of the sheet bordering the slots.
Figure 16:
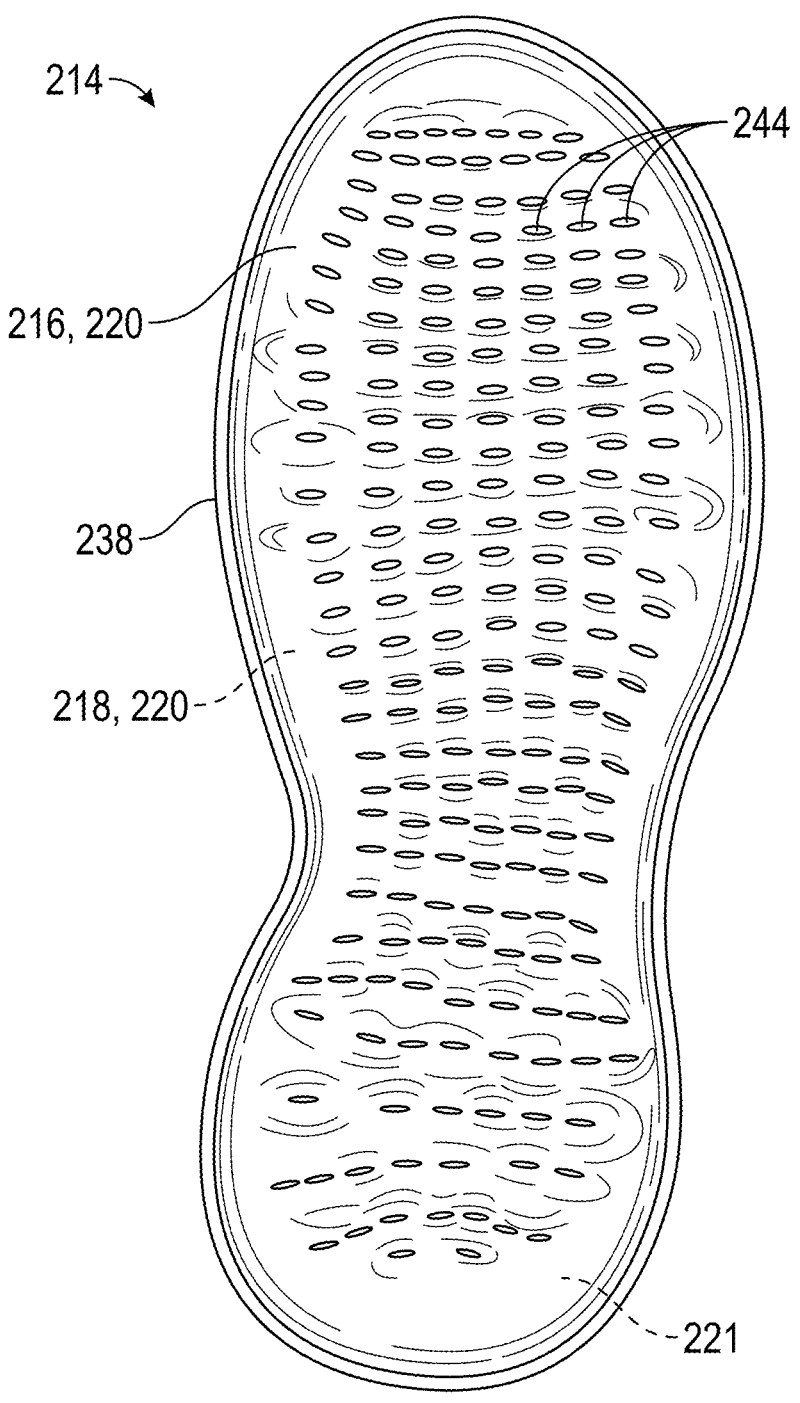
FIG. 16 is a plan view of a cushioning component in an inflated state, configured for use as a full-length midsole in a sole structure of an article of footwear, including the core of FIGS. 14-15 disposed between and bonded to opposing inner surfaces of first and second barrier sheets of a bladder.
Figure 17:
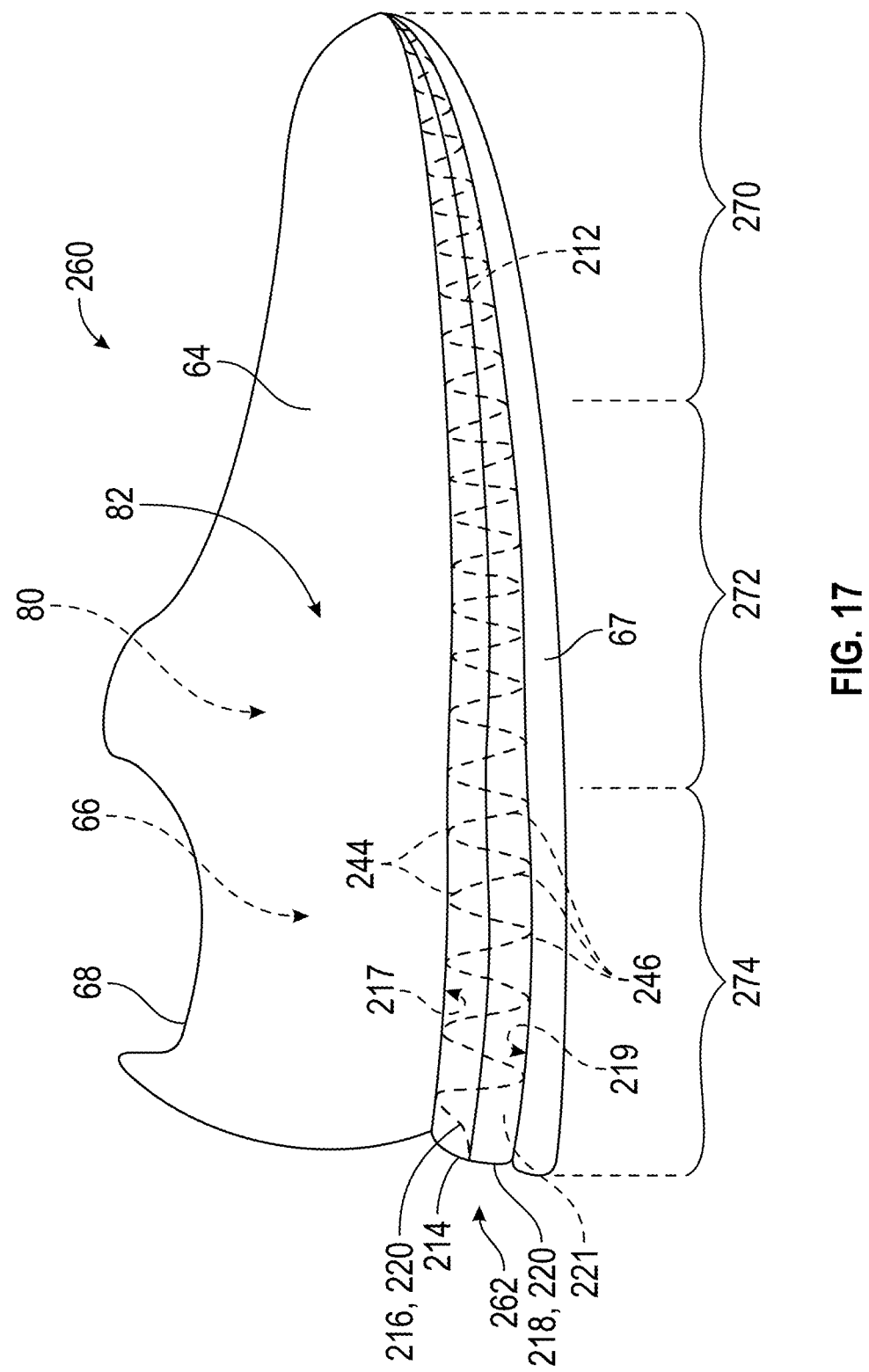
FIG. 17 is a lateral side view of an article of footwear showing the cushioning component of FIG. 16 disposed in a heel region, a midfoot region, and a forefoot region of a sole structure.

FIGS. 14-17 show another embodiment of a core 212. Specifically, FIG. 14 is a plan view of a side 226 of the core 212 trimmed from a polymeric sheet 210 with anti-weld material 24 disposed thereon in a predetermined pattern, referred to herein as a second predetermined pattern, and showing spaced slots 236 extending through the polymeric sheet 210 to define strips 210A, 210B, 210C, 210D, 210E, 210F, 210G, 210H, and 210I of the polymeric sheet 210 bordering the slots 236. The core 212 is a full-length core having a forefoot region 270A, a midfoot region 272A, and a heel region 274A that will correspond with a forefoot region 270, a midfoot region 272, and a heel region 274 of a sole structure 262 that includes the core 212 and the article of footwear 260 into which the sole structure 262 is incorporated as shown in FIG. 17. Each of the slots 236 extends longitudinally from a respective first end 236A near a forward extent in the forefoot region 270A to a second end 236B near a rearward extent in the heel region 274A. The side 226 is referred to as a second side and it will face the inner surface 219 of a second barrier sheet 218 of a bladder 220 included in the cushioning component 214.

The strips 210B, 210C, 210D, 210E, 210F, 210G and 210H have spaced uncovered areas 223 on the second side 226 (e.g., areas not covered by the anti-weld material 24) each extending the width of the respective strip. Only some of the uncovered areas 223 are labeled in FIG. 14 for clarity.

FIG. 15 is a plan view of an opposing side 222 of the polymeric sheet 210 of the core 212 of FIG. 14 with anti-weld material 24 disposed thereon in a different pattern than on the side 226 shown in FIG. 14. The pattern of anti-weld material 24 on the side 222 is referred to as a first predetermined pattern. The side 222 is referred to as a first side and interfaces with the inner surface 217 of the first barrier sheet 216 of the bladder 220 when the core 212 is thermally processed with the barrier sheets 216, 218 to form the cushioning component 214. The strips 210B, 210C, 210D, 210E, 210F, 210G and 210H have spaced uncovered areas 225 on the first side 222 (e.g., areas not covered by the anti-weld material 24) each extending the width of the respective strip. Only some of the uncovered areas 225 are labeled in FIG. 15 for clarity.

The uncovered areas 223 become bonded to the inner surface 219, establishing a second set of bonds 246. The uncovered areas 225 become bonded to the inner surface 217 establishing a first set of bonds 244. Each of the strips 210B, 210C, 210D, 210E, 210F, 210G, and 210H will traverse the interior cavity 21 of the bladder 220 and tether the barrier sheets 216, 218 by the bonds 244, 246.

The outermost strips 210A and 210I have no uncovered areas and hence will not be bonded to the bladder 220. The slots 236 generally follow the curvature of the outer perimeter 234 of the core 212. The uncovered areas 223 alternate with the uncovered areas 225 along the length of each strip 210B-210H. Each strip 210B-210H will thus alternate from a bond 244 at the top barrier sheet 216 to a bond 246 at the bottom barrier sheet 218 in progressing from the heel region 274 to the forefoot region 270.

FIG. 16 is a plan view of the cushioning component 214 after inflation and sealing the barrier sheets 216, 218 to one another at the perimeter bond 238. Only some of the bonds 244 are labeled in FIG. 16. FIG. 17 shows the lateral side 82 of the article of footwear 260, including the footwear upper 64 as described with respect to FIG. 8, and the bladder 220 disposed as a full-length midsole in the sole structure 262 extending in the heel region 274, the midfoot region 272, and the forefoot region 270 of the sole structure 262. The outsole 67 extends under the cushioning component 214.

Accordingly, a method of manufacturing a cushioning component such as cushioning component 14, 114, or 214 for a wearable article such as an article of footwear 60 or 260 includes disposing blocker ink (represented as the anti-weld material 24) on opposing first and second sides of at least one polymeric sheet 10, 110, or 210. Disposing the blocker ink may be by digital printing, such as digitally printing a first pattern of blocker ink on the first side and a second pattern of blocker ink on the second side. The first pattern may be different than the second pattern such that at least some areas on which blocker ink is not disposed on the first side are opposite from areas on the second side at which blocker ink is disposed.

The method includes cutting a plurality of slots 36, 136, or 236 through the at least on polymeric sheet 10, 110, or 210. An automatic, programmable cutting machine may be used to cut the slots. Each slot has a first end and a second end with both the first end and the second end inward of an outer perimeter 34, 134, or 234 of the polymeric sheet 10, 110, or 210 such that the at least one polymeric sheet includes a plurality of strips (e.g., strip 10A and 10B, 110A and 110B, or 210B and 210C, for example) bordering the slots and decoupled from one another at the slots. The polymeric sheet 10, 110, and 210 may also be cut, such as with the cutting machine, by trimming the polymeric sheet 10, 110, and 210 to establish the outer perimeter 34, 134, or 234 of the core 12, 112, or 212.

The method of manufacturing further includes placing the at least one polymeric sheet between a first barrier sheet 16, 116, or 216 and a second barrier sheet 18, 118, or 218 as a core 12, 112, or 212, and thermally bonding: (i) the at least one polymeric sheet to opposing inner surfaces 17, 117, or 217 which are opposing the inner surfaces 19, 119, and 219, respectively, of the first barrier sheet and the second barrier sheet at a plurality of bonds 44 and 46, 144 and 146, or 244, 246 at the uncovered areas (23, 123, or 223, and 25, 125, or 225) of the at least one polymeric sheet at which the anti-weld material 24 is not disposed to tether the first barrier sheet to the second barrier sheet, as well as (ii) the first barrier sheet to the second barrier sheet at a peripheral bond 38, 138, or 238 entirely outward of the at least one polymeric sheet to enclose an interior cavity 21, 121, and 221 that extends between the opposing inner surfaces to define a bladder. A port between the barrier sheets may remain open to allow the interior cavity 21, 121, or 221 to be inflated, and then the port is also sealed to maintain gas, such as air, in the interior cavity.

The plurality of bonds may be arranged in a pattern such that a gas in the interior cavity is in fluid communication around the at least one polymeric sheet without the at least one polymeric sheet creating any sealed chambers within the bladder that are not in fluid communication with the interior cavity.

In an implementation in which the cushioning component is for an article of footwear, such as the article of footwear 60 or 260 discussed herein, for example, the method may further include disposing the cushioning component 14, 114, or 214 in a sole structure 62 or 262 of the article of footwear.

The following Clauses provide example configurations of a cushioning component for a wearable article, such as an article of footwear, and a method of manufacturing the cushioning component, as disclosed herein.

Clause 1. A cushioning component for a wearable article, the cushioning component comprising: a bladder including a first barrier sheet and a second barrier sheet defining an interior cavity between opposing inner surfaces of the first barrier sheet and the second barrier sheet, the first barrier sheet and the second barrier sheet sealed to one another along a peripheral bond to enclose the interior cavity and retain a gas in the interior cavity; and a core disposed in the interior cavity, spaced entirely inward of the peripheral bond, the core traversing the interior cavity between and bonded to the opposing inner surfaces of the first barrier sheet and the second barrier sheet at a plurality of bonds to tether the first barrier sheet to the second barrier sheet, the core displaced from the opposing inner surfaces by the gas at unbonded areas of the core; wherein the core includes at least one polymeric sheet defining a plurality of spaced slots extending therethrough from a first side of the at least one polymeric sheet to a second side of the at least one polymeric sheet, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds.

Clause 2. The cushioning component of clause 1, wherein the bonds are arranged in a pattern such that the gas in the interior cavity is in fluid communication around the core without the core creating any sealed chambers within the bladder that are not in fluid communication with the interior cavity.

Clause 3. The cushioning component of clause 2, further comprising: blocker ink disposed on the core at the unbonded areas.

Clause 4. The cushioning components of any of clauses 1-2, wherein: the plurality of strips includes a first strip and a second strip adjacent to the first strip; and a distance from a first end of the first strip to the at least one bond on the first strip nearest the first end of the first strip is different than a distance from a first end of the second strip to the at least one bond on the second strip nearest to the first end of the second strip.

Clause 5. The cushioning component of any of clauses 1-2, wherein: the plurality of strips includes a first strip and a second strip adjacent to the first strip; each of the first strip and the second strip includes two or more of the bonds; and the two or more bonds on the first strip are spaced differently from one another than the two or more bonds on the second strip.

Clause 6. The cushioning component of clause 5, wherein: the first strip is closer to a perimeter of the core than the second strip; and the two or more bonds on the first strip are further apart from one another than the two or more bonds on the second strip, the first and second barrier sheets thus held closer to one another by the core at the second strip than at the first strip, creating a depression at an outer surface of the bladder from the first strip to the second strip.

Clause 7. The cushioning component of any of clauses 1-2, wherein at least some of the slots are linear.

Clause 8. The cushioning component of clause 7, wherein: the slots are linear and extend parallel to opposing first and second side edges of the core.

Clause 9. The cushioning component of clause 8, wherein: the number of bonds on each of the strips increases in order in a direction away from each of the side edges such that the strips closer to the side edges have a greater number of the bonds than the strips further from the side edges.

Clause 10. The cushioning component of clause 9, wherein: the wearable article is an article of footwear; the cushioning component is included in a sole structure of the article of footwear and is disposed in a heel region of the article of footwear; and spacing between the bonds on strips closer to the perimeter is greater than spacing between the bonds on strips further from the perimeter such that the core creates a depression at the outer surface of the first barrier sheet that serves as at least a portion of a footbed.

Clause 11. The cushioning component of any of clauses 1-2, wherein at least some of the slots are curved and follow a curved perimeter of the core.

Clause 12. The cushioning component of clause 11, wherein: the wearable article is an article of footwear; the cushioning component is included in a sole structure of the article of footwear and is disposed in a heel region of the article of footwear; and at least some of the slots are arranged in a series that curves around a rear of the heel region from a medial side to a lateral side of the cushioning component.

Clause 13. The cushioning component of clause 11, wherein: spacing between the bonds on strips closer to the perimeter is greater than spacing between the bonds on strips further from the perimeter such that the core creates a depression at the outer surface of the first barrier sheet that serves as a heel cup.

Clause 14. The cushioning component of any of clauses 1-2, wherein: the first side of the core is bonded to the inner surface of the first barrier sheet at a first set of bonds of the plurality of bonds, the second side of the core is bonded to the inner surface of the second barrier sheet at a second set of bonds of the plurality of bonds; and the bonds of the first set alternate with the bonds of the second set along each of the strips.

Clause 15. The cushioning component of any of clauses 1-2, wherein at least some of the strips have of a constant width.

Clause 16. A method of manufacturing a cushioning component for a wearable article, the method of manufacturing comprising: disposing blocker ink on opposing first and second sides of at least one polymeric sheet; cutting a plurality of slots through the at least on polymeric sheet, each slot having a first end and a second end with both the first end and the second end inward of an outer perimeter of the polymeric sheet such that the at least one polymeric sheet includes a plurality of strips bordering the slots and decoupled from one another at the slots; placing the at least one polymeric sheet between a first barrier sheet and a second barrier sheet as a core; and thermally bonding: the at least one polymeric sheet to opposing inner surfaces of the first barrier sheet and the second barrier sheet at a plurality of bonds at areas of the at least one polymeric sheet at which the blocker ink is not disposed to tether the first barrier sheet to the second barrier sheet; and the first barrier sheet to the second barrier sheet at a peripheral bond entirely outward of the at least one polymeric sheet to enclose an interior cavity that extends between the opposing inner surfaces to define a bladder.

Clause 17. The method of manufacturing of clause 16, wherein the bonds are arranged in a pattern such that a gas in the interior cavity is in fluid communication around the at least one polymeric sheet without the at least one polymeric sheet creating any sealed chambers within the bladder that are not in fluid communication with the interior cavity.

Clause 18. The method of manufacturing of clause 15, wherein: disposing the blocker ink on the opposing first and second sides of the at least one polymeric sheet is by digitally printing a first pattern of blocker ink on the first side and a second pattern of blocker ink on the second side; wherein the first pattern is different than the second pattern such that at least some areas on which blocker ink is not disposed on the first side are opposite from areas on the second side at which blocker ink is disposed.

Clause 19. The method of manufacturing of clause 15, wherein the wearable article is an article of footwear, and further comprising: disposing the cushioning component in a sole structure of an article of footwear.

Clause 20. The method of manufacturing of clause 19, wherein the cushioning component is disposed in a heel region of the article of footwear; and spacing between the bonds on strips closer to a perimeter of the core is greater than spacing between the bonds on strips further from the perimeter of the core such that the core creates a depression at the outer surface of the first barrier sheet that serves as at least a portion of a footbed.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" particularly refers to a direction extending a length of a component. For example, a longitudinal direction of a shoe extends between a forefoot region and a heel region of the shoe. The term "forward" or "anterior" is used to particularly refer to the general direction from a heel region toward a forefoot region, and the term "rearward" or "posterior" is used to particularly refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" particularly refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" particularly refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" particularly refers to the vertical direction pointing towards a top of the component, which may include an instep, a fastening region and/or a throat of an upper. The term "downward" or "downwards" particularly refers to the vertical direction pointing opposite the upwards direction, toward the bottom of a component and may generally point towards the bottom of a sole structure of an article of footwear.

The "interior" of an article of footwear, such as a shoe, particularly refers to portions at the space that is occupied by a wearer's foot when the shoe is worn. The "inner side" of a component particularly refers to the side or surface of the component that is (or will be) oriented toward the interior of the component or article of footwear in an assembled article of footwear. The "outer side" or "exterior" of a component particularly refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" particularly refer to the direction toward the interior of the component or article of footwear, such as a shoe, and the terms "outward" and "outwardly" particularly refer to the direction toward the exterior of the component or article of footwear, such as the shoe. In addition, the term "proximal" particularly refers to a direction that is nearer a center of a footwear component, or is closer toward a foot when the foot is inserted in the article of footwear as it is worn by a user. Likewise, the term "distal" particularly refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A cushioning component for a wearable article, the cushioning component comprising:

a bladder including a first barrier sheet and a second barrier sheet defining an interior cavity between oppos- ing inner surfaces of the first barrier sheet and the second barrier sheet, the first barrier sheet and the second barrier sheet sealed to one another along a peripheral bond to enclose the interior cavity and retain a gas in the interior cavity; and a core disposed in the interior cavity, spaced entirely inward of the peripheral bond, the core traversing the interior cavity between and bonded to the opposing inner surfaces of the first barrier sheet and the second barrier sheet at a plurality of bonds to tether the first barrier sheet to the second barrier sheet, the core displaced from the opposing inner surfaces by the gas at unbonded areas of the core;

wherein the core includes at least one polymeric sheet defining a plurality of spaced slots extending there- through from a first side of the at least one polymeric sheet to a second side of the at least one polymeric sheet, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds;

wherein the first side of the core is bonded to the inner surface of the first barrier sheet at a first set of bonds of the plurality of bonds, the second side of the core is bonded to the inner surface of the second barrier sheet at a second set of bonds of the plurality of bonds; and wherein the bonds of the first set alternate with the bonds of the second set along each of the strips.

2. The cushioning component of claim 1, wherein the bonds are arranged in a pattern such that the gas in the interior cavity is in fluid communication around the core without the core creating any sealed chambers within the bladder that are not in fluid communication with the interior cavity.

3. The cushioning component of claim 2, further com- prising:

blocker ink disposed on the core at the unbonded areas.

4. The cushioning component of claim 1, wherein:

the plurality of strips includes a first strip and a second strip adjacent to the first strip; and a distance from a first end of the first strip to the at least one bond on the first strip nearest the first end of the first strip is different than a distance from a first end of the second strip to the at least one bond on the second strip nearest to the first end of the second strip.

5. The cushioning component of claim 1, wherein:

the plurality of strips includes a first strip and a second strip adjacent to the first strip;

each of the first strip and the second strip includes two or more of the bonds; and the two or more bonds on the first strip are spaced differently from one another than the two or more bonds on the second strip.

6. The cushioning component of claim 5, wherein:

the first strip is closer to a perimeter of the core than the second strip; and the two or more bonds on the first strip are further apart from one another than the two or more bonds on the second strip, the first and second barrier sheets thus held closer to one another by the core at the second strip than at the first strip, creating a depression at an outer surface of the bladder from the first strip to the second strip.

7. The cushioning component of claim 1, wherein at least some of the slots are linear.

8. The cushioning component of claim 7, wherein:

the slots are linear and extend parallel to opposing first and second side edges of the core.

9. The cushioning component of claim 8, wherein:

the number of bonds on each of the strips increases in order in a direction away from each of the side edges such that the strips closer to the side edges have a fewer number of the bonds than the strips further from the side edges.

10. The cushioning component of claim 9, wherein:

the wearable article is an article of footwear;

the cushioning component is included in a sole structure of the article of footwear and is disposed in a heel region of the article of footwear; and spacing between the bonds on strips closer to the perim- eter is greater than spacing between the bonds on strips further from the perimeter such that the core creates a depression at the outer surface of the first barrier sheet that serves as at least a portion of a footbed.

11. The cushioning component of claim 1, wherein at least some of the strips have of a constant width.

12. A cushioning component for a wearable article, the cushioning component comprising:

a bladder including a first barrier sheet and a second barrier sheet defining an interior cavity between oppos- ing inner surfaces of the first barrier sheet and the second barrier sheet, the first barrier sheet and the second barrier sheet sealed to one another along a peripheral bond to enclose the interior cavity and retain a gas in the interior cavity; and a core disposed in the interior cavity, spaced entirely inward of the peripheral bond, the core traversing the interior cavity between and bonded to the opposing inner surfaces of the first barrier sheet and the second barrier sheet at a plurality of bonds to tether the first barrier sheet to the second barrier sheet, the core displaced from the opposing inner surfaces by the gas at unbonded areas of the core;

wherein the core includes at least one polymeric sheet defining a plurality of spaced slots extending there- through from a first side of the at least one polymeric sheet to a second side of the at least one polymeric sheet, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds; and wherein at least some of the slots are curved and follow a curved perimeter of the core.

13. The cushioning component of claim 12, wherein:

the wearable article is an article of footwear;

the cushioning component is included in a sole structure of the article of footwear and is disposed in a heel region of the article of footwear; and at least some of the slots are arranged in a series that curves around a rear of the heel region from a medial side to a lateral side of the cushioning component.

14. The cushioning component of claim 12, wherein:

spacing between the bonds on strips closer to the perimeter is greater than spacing between the bonds on strips further from the perimeter such that the core creates a depression at the outer surface of the first barrier sheet that serves as a heel cup.

15. A cushioning component for a wearable article, the cushioning component comprising:

a bladder including a first barrier sheet and a second barrier sheet defining an interior cavity between opposing inner surfaces of the first barrier sheet and the second barrier sheet, the first barrier sheet and the second barrier sheet sealed to one another along a peripheral bond to enclose the interior cavity and retain a gas in the interior cavity; and a core disposed in the interior cavity, spaced entirely inward of the peripheral bond, the core traversing the interior cavity between and bonded to the opposing inner surfaces of the first barrier sheet and the second barrier sheet at a plurality of bonds to tether the first barrier sheet to the second barrier sheet, the core displaced from the opposing inner surfaces by the gas at unbonded areas of the core;

wherein the core includes at least one polymeric sheet defining a plurality of spaced slots extending therethrough from a first side of the at least one polymeric sheet to a second side of the at least one polymeric sheet, each slot having a first end and a second end with both the first end and the second end inward of an outer perimeter of the core such that the core includes a plurality of strips bordering the slots and decoupled from one another at the slots, each strip bonded to at least one of the first barrier sheet or the second barrier sheet by at least one of the bonds;

wherein at least some of the slots are linear and extend parallel to opposing first and second side edges of the core; and wherein the number of bonds on each of the strips increases in order in a direction away from each of the side edges such that the strips closer to the side edges have a fewer number of the bonds than the strips further from the side edges.

16. The cushioning component of claim 15, wherein:

the wearable article is an article of footwear;

the cushioning component is included in a sole structure of the article of footwear and is disposed in a heel region of the article of footwear; and spacing between the bonds on strips closer to the perimeter is greater than spacing between the bonds on strips further from the perimeter such that the core creates a depression at the outer surface of the first barrier sheet that serves as at least a portion of a footbed.

17. The cushioning component of claim 15, wherein the bonds are arranged in a pattern such that the gas in the interior cavity is in fluid communication around the core without the core creating any sealed chambers within the bladder that are not in fluid communication with the interior cavity.

18. The cushioning component of claim 17, further comprising:

blocker ink disposed on the core at the unbonded areas.

19. The cushioning component of claim 15, wherein:

the plurality of strips includes a first strip and a second strip adjacent to the first strip; and a distance from a first end of the first strip to the at least one bond on the first strip nearest the first end of the first strip is different than a distance from a first end of the second strip to the at least one bond on the second strip nearest to the first end of the second strip.

20. The cushioning component of claim 15, wherein:

the plurality of strips includes a first strip and a second strip adjacent to the first strip;

each of the first strip and the second strip includes two or more of the bonds; and the two or more bonds on the first strip are spaced differently from one another than the two or more bonds on the second strip.

\* \* \* \* \*